(12) United States Patent
Iwasaki et al.

(10) Patent No.: US 7,970,205 B2
(45) Date of Patent: Jun. 28, 2011

(54) ITERATIVE MOTION SEGMENTATION

(75) Inventors: Masahiro Iwasaki, Nara (JP);
Arasanathan Thayananthan, Green Essex (GB); Roberto Cipolla, Cambridge (GB)

(73) Assignee: Panasonic Corporation, Osaka (JP)

( * ) Notice: Subject to any disclaimer, the term of this patent is extended or adjusted under 35 U.S.C. 154(b) by 846 days.

(21) Appl. No.: 11/994,748

(22) PCT Filed: Dec. 1, 2006

(86) PCT No.: PCT/GB2006/004502
§ 371 (c)(1),
(2), (4) Date: Jan. 4, 2008

(87) PCT Pub. No.: WO2008/065319
PCT Pub. Date: Jun. 5, 2008

(65) Prior Publication Data
US 2010/0128926 A1    May 27, 2010

(51) Int. Cl.
*G06K 9/62* (2006.01)
(52) U.S. Cl. .................. 382/155; 382/103; 382/284
(58) Field of Classification Search .............. 382/103
See application file for complete search history.

(56) References Cited

U.S. PATENT DOCUMENTS
6,826,292 B1    11/2004    Tao et al.

FOREIGN PATENT DOCUMENTS
| JP | 6-253197 | 9/1994 |
| JP | 2002-352248 | 12/2002 |
| JP | 2005-276149 | 10/2005 |
| JP | 2006-101166 | 4/2006 |

OTHER PUBLICATIONS

International Search Report issued Jun. 27, 2007 in the International (PCT) Application of which the present application is the U.S. National Stage.
PCT Written Opinion of the International Search Authority, issued Jun. 27, 2007.
Andrea Colombari, "*Image-Based Techniques for View Synthesis and Video Editing*", Ph.D. Thesis, [Online], Apr. 11, 2006, XP002437843.

(Continued)

*Primary Examiner* — Samir A Ahmed
*Assistant Examiner* — Ruiping Li
(74) *Attorney, Agent, or Firm* — Wenderoth, Lind & Ponack, L.L.P.

(57) ABSTRACT

An image processing device which simultaneously secures and extracts a background image, at least two object images, a shape of each object image and motion of each object image, from among plural images, the image processing device including an image input unit (101) which accepts input of plural images; a hidden parameter estimation unit (102) which estimates a hidden parameter based on the plural images and a constraint enforcement parameter, which indicates a condition of at least one of the hidden parameters, using an iterative learning method; a constraint enforcement parameter learning unit (103) which learns a constraint enforcement parameter related to the hidden parameter using an estimation result from the hidden parameter estimation unit as a training signal; and a complementary learning unit (104) which causes the estimation of the hidden parameter and the learning of the constraint enforcement parameter, which utilize the result from the learning of the hidden parameter, to be iterated.

8 Claims, 20 Drawing Sheets

OTHER PUBLICATIONS

P-M. Jodoin, et al., "*Unsupervised Motion Detection Using a Markovian Temporal Model With Global Spatial Constraints*", Image Processing, 2004. ICIP '04, 2004 International Conference on Signapore, Oct. 24-27, 2004, Piscataway, NJ, USA, IEEE, Oct. 24, 2004, pp. 2591-2594, XP010786318.

Chris Stauffer, et al., "*Adaptive Background Mixture Models for Real-Time Tracking*", IEEE Computer Society Conference Computer Vision and Pattern Recognition.

John Winn et al., "*Generative Affine Localisation and Tracking*", Neural Information Processing Systems.

John Winn et al., "*Variational Message Passing*", Journal of Machine Learning Research (2004).

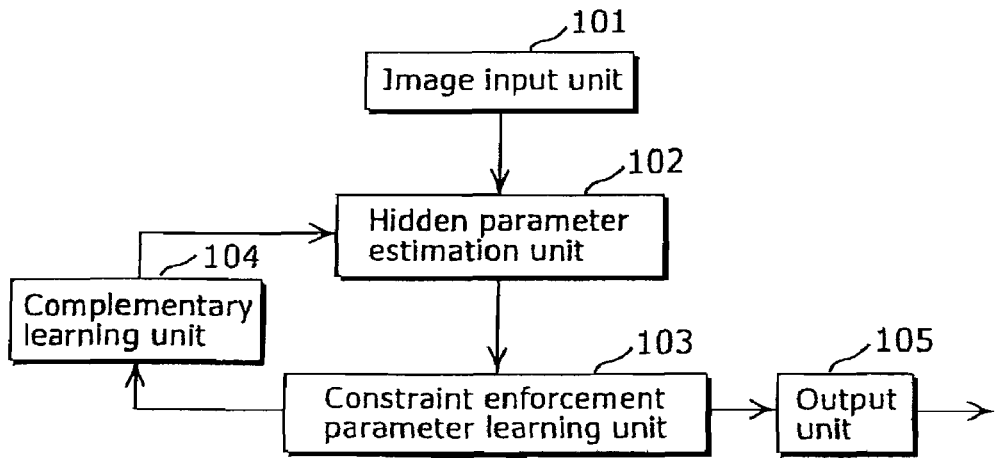
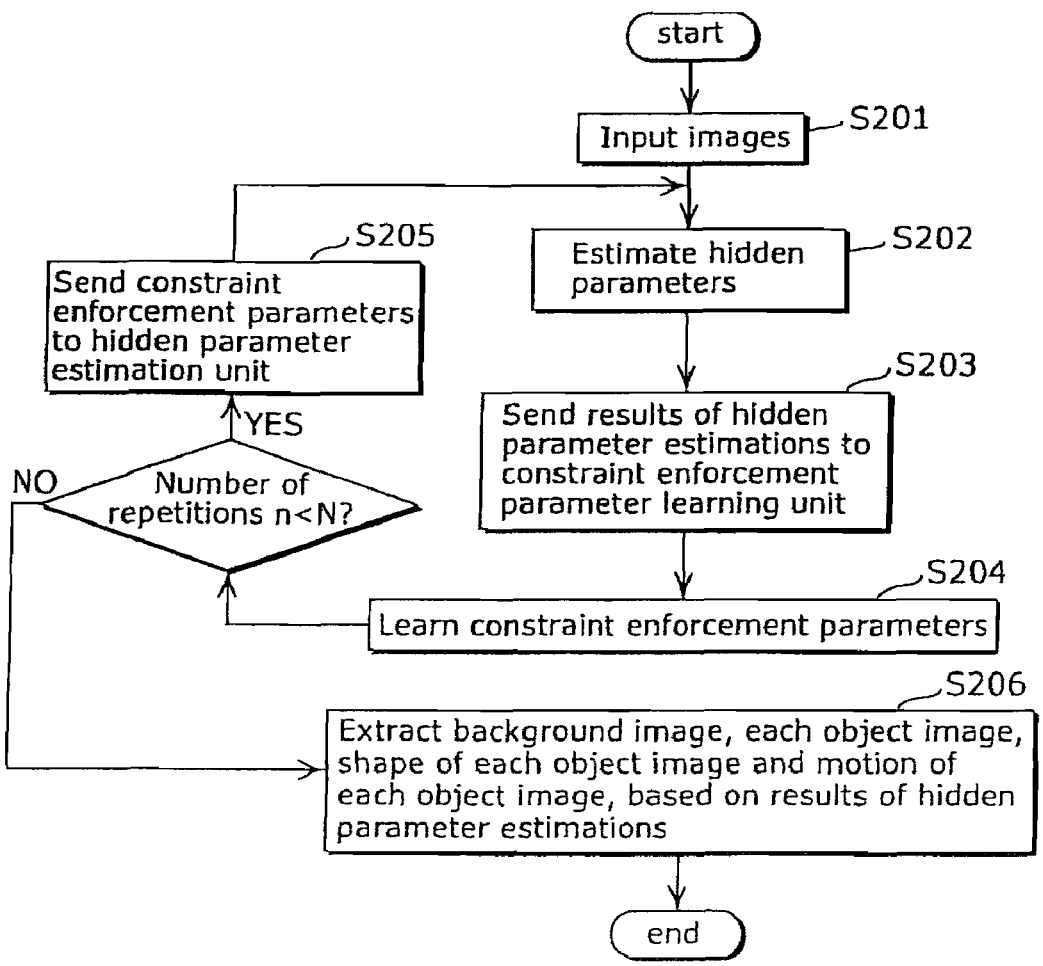

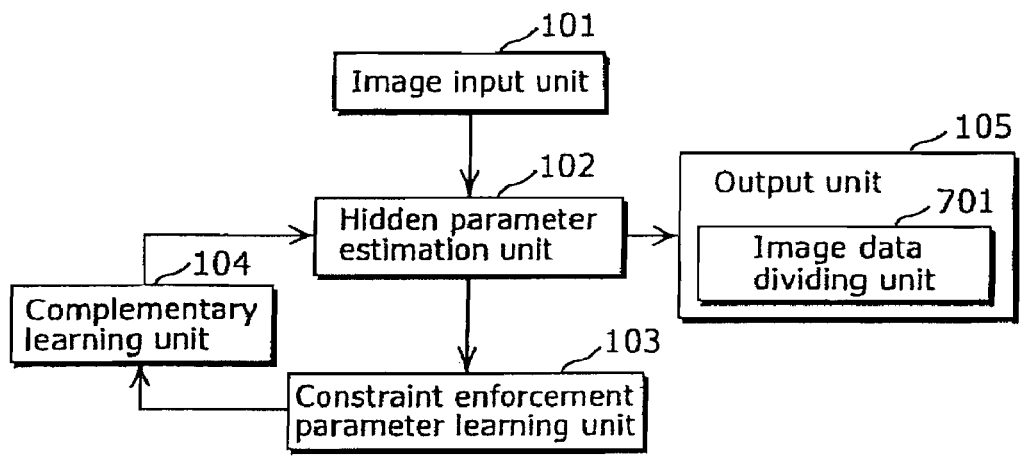
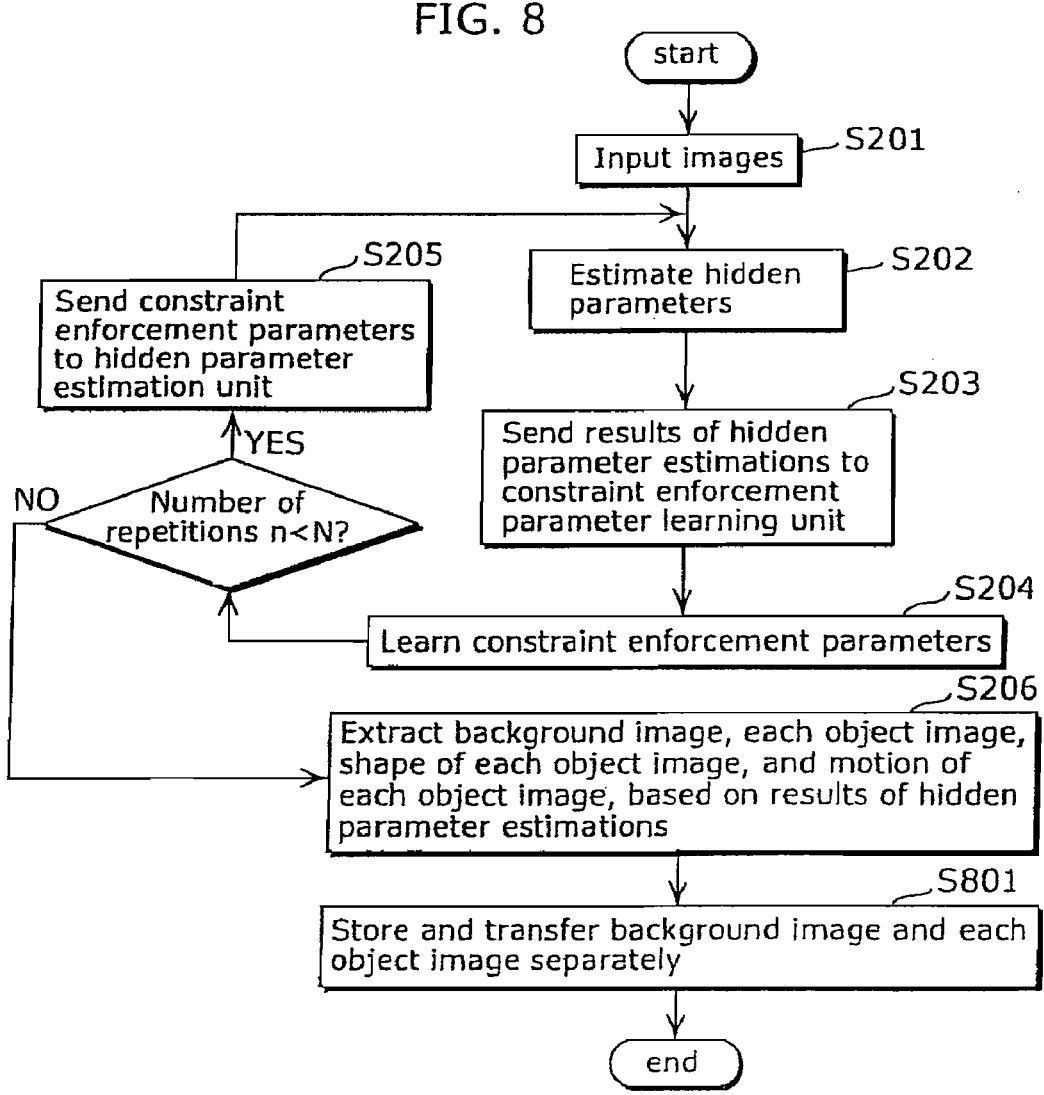

Input images 301

Display image A 1901

Display image B 1902

Image of object 1 1903

Image of object 2 1904

Unnecessary object image erasure sequence 1905

ITERATIVE MOTION SEGMENTATION

TECHNICAL FIELD

The present invention relates to an image processing method and an image processing device for simultaneously extracting, from plural images, a background image, at least two or more object images, the shape of each of the object images, and the motion of each of the object images.

BACKGROUND ART

Among techniques for extracting a background image and an object image which is a foreground image from plural images, there is a method which utilizes three-dimensional information. In this method, the three-dimensional information of an image scene is obtained using a stereo camera, a range finder, or the like, and the background image and an object image are separated from each other based on the three-dimensional information that is obtained. However, such a technique requires a device for measuring three-dimensional information.

There is also a technique proposed for extracting the background image and an object image which is a foreground image, without using three-dimensional information. For example, the technique described in Non-patent document 1 (Chris Stauffer and Eric Grimson, "Adaptive Background Mixture Models for Real-time Tracking," IEEE Computer Society Conference Computer Vision and Pattern Recognition, pp.246-252, 1999) is capable of probabilistically modeling temporal variations in pixels to perform background differentiation which flexibly supports temporal variations in pixels. This technique enables the background image and an object image to be separated from each other in a reliable manner.

Furthermore, Non-patent document 2 (John Winn and Andrew Blake, "Generative Affine Localisation and Tracking", Neural Information Processing Systems, No.17, pp.1505-1512, 2004) and Non-patent document 3 (John Winn and Christopher Bishop, "Variational Message Passing", Journal of Machine Learning Research, Vol. 6, pp. 661-694, 2005) propose a technique for simultaneously extracting, from plural images, the following elements defined as hidden parameters: a background image, one object image, the shape of one object image, and the motion of one object image. In this technique, plural parameters defined as hidden parameters are extracted through joint optimization, using images as inputs. This technique enables robust extraction of parameters since plural hidden parameters act in a complementary manner even in the case where noise has occurred or the shape of an object has changed. This technique has another advantage in that there is no need to perform parameter tuning such as setting a threshold or weighting an energy function in the background differentiation process.

However, the techniques described in the above-mentioned Non-patent documents 1 to 3 have a problem of being unable to simultaneously extract plural objects and the motion of each of such objects in a reliable manner.

The image processing method represented by Non-patent document 1 is a technique for separating the background image from another object, and thus when plural objects exist in the image, it is not possible to extract them as individual objects. In order to be able to do so, this technique requires the additional use of a segmentation technique that utilizes information about the objects, such as their colors and motion.

Meanwhile, the image processing method represented by Non-patent documents 2 and 3 is capable of simultaneously extracting plural hidden parameters from image information only. However, the larger the number of objects included in an image, the more the number of hidden parameters that should be solved. There are also other causes that increase the number of hidden parameters. For example, the number of hidden parameters increases due to camera motion as well as a motion parameter for adapting to complexity in motion and an image degradation parameter for modeling degradation in image quality for the purpose of improving image quality. The use of these parameters means that there is a further expansion of the search space. This results in local minima and thus there is a higher risk of being unable to obtain a desired solution. For example, the use of this technique to extract two or more object images ends up extracting plural objects as one object that is at a local minimum. Thus, a local minimum must be avoided. One of the most important means for avoiding local minima is to give a constraint on an extensive search space made up of hidden parameters. However, while the provision of knowledge about an image scene in advance as a constraint serves as an effective means for avoiding local minima, there is a drawback in that applicable image scenes are limited. Therefore, it is not preferable to conduct supervised learning that utilizes previously given knowledge in relation to input images.

DISCLOSURE OF INVENTION

In view of the above problems, the present invention has an object of providing an image processing method and an image processing device capable of simultaneously extracting, from plural images, a background image, at least two or more object images, the shape of each of the object images, and the motion of each of the object images, without resulting in local minima, that is, in a reliable manner.

In order to solve the above problems, the present invention is an image processing method of simultaneously extracting a background image, at least two object images, a shape of each object image and motion of each object image, which are defined as hidden parameters, from among plural images, the image processing method including: an image input step of accepting input of plural images; a hidden parameter estimation step of estimating a hidden parameter based on the plural images and a constraint enforcement parameter, which indicates a constraint of at least one of the hidden parameters, using an iterative learning method; a constraint enforcement parameter learning step of learning a constraint enforcement parameter related to the hidden parameter using an estimation result from the hidden parameter estimation step as a training signal, and; a complementary learning step of causing the estimation of the hidden parameter and the learning of the constraint enforcement parameter to be iterated, the estimation of the hidden parameters being performed in the hidden parameter estimation step, which uses a learning result given in the constraint enforcement parameter learning step, and the learning of the constraint enforcement parameter being performed in the constraint enforcement parameter learning step, which uses the estimation result of the hidden parameter given in the hidden parameter estimation step; and an output step of outputting the hidden parameter estimated in the hidden parameter estimation step after the iterative learning is performed in the complementary learning step.

It should be noted that it is not only possible to embody the present invention as the above-described image processing method, but also as: an image processing device that includes the above-described steps as its constituent elements; a program that causes a computer to execute these steps; and a computer-readable storage medium, such as a CD-ROM, on which this program is stored.

The above-described method, device, and the like make it possible to simultaneously extract, from plural images, a background image, at least two or more object images, the shape of each of the object images, and the motion of each of the object images, without resulting in local minima, that is, in a reliable manner. Since local minima can be avoided, another hidden parameter may be employed in addition, such as a camera motion parameter.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 1 is a diagram showing a basic structure of an image processing device according to a first embodiment of the present invention;

FIG. 2 is a flowchart showing basic operations performed by the image processing device according to the first embodiment of the present invention;

FIG. 7 is a diagram showing an example structure of an image processing device according to a first variation of the first embodiment of the present invention;

FIG. 8 is a flowchart showing operations performed by the image processing device according to the first variation of the first embodiment of the present invention;

BEST MODE FOR CARRYING OUT THE INVENTION

Figure 3:
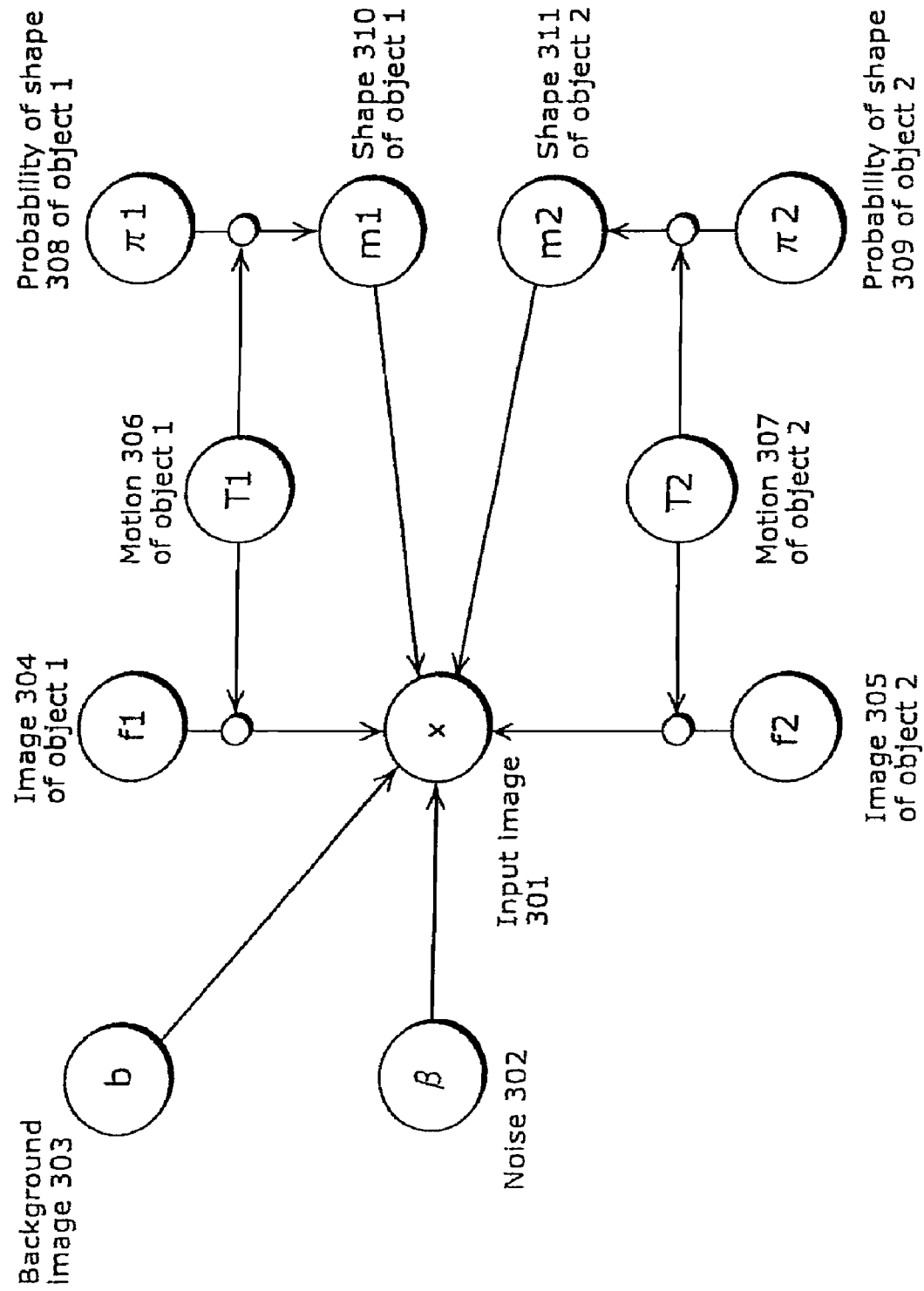
FIG. 3 is a diagram showing example processes performed by a hidden parameter estimation unit according to the first embodiment of the present invention.

One embodiment of the present invention is an image processing method of simultaneously extracting a background image, at least two object images, a shape of each object image and motion of each object image, which are defined as hidden parameters, from among plural images, the image processing method including: an image input step of accepting input of plural images; a hidden parameter estimation step of estimating a hidden parameter based on the plural images and a constraint enforcement parameter, which indicates a condition of at least one of the hidden parameters, using an iterative learning method; a constraint enforcement parameter learning step of learning a constraint enforcement parameter related to the hidden parameter using an estimation result from the hidden parameter estimation step as a training signal, and; a complementary learning step of causing the estimation of the hidden parameter and the learning of the constraint enforcement parameter to be iterated, the estimation of the hidden parameters being performed in the hidden parameter estimation step, which uses a learning result given in the constraint enforcement parameter learning step, and the learning of the constraint enforcement parameter being performed in the constraint enforcement parameter learning step, which uses the estimation result of the hidden parameter given in the hidden parameter estimation step; and an output step of outputting the hidden parameter estimated in the hidden parameter estimation step after the iterative learning is performed in the complementary learning step.

The hidden parameter is estimated using a constraint enforcement parameter, which indicates a constraint of at least one of the hidden parameters, and thus it is possible to simultaneously extract from the plural images a background image, at least two of the object images, the shapes of the object images and the motion of the object images, while avoiding a local minimum.

In a preferred embodiment of the present invention, the constraint enforcement parameter is a parameter related to at least one of the following conditions: an area size for each object image, a color of each object image, and a pixel motion that is included in each object image.

Information about the size of each object image area, the color of each object image and the motion of each pixel included in each object image, which are good constraint conditions for hidden parameter estimation and are effective in avoiding a local minimum.

In another preferred embodiment of the present invention, in the constraint enforcement parameter learning step, adjacent pixels are chosen from the plural images to become a pair and the respective pixels are assessed to belong to either an image area of the background image or an image area of each object, and different respective constraints are applied to the hidden parameter depending on whether the respective pixels belong to different objects or the respective pixels belong to the same object.

Different constraints are applied to the hidden parameter when the pixels belong to different objects and when they belong to the same object, and thus it is possible to effectively separate and extract plural object images.

In another preferred embodiment of the present invention, the constraint enforcement parameter learning step includes learning the constraint enforcement parameter based on an energy minimization method using the estimation result from the hidden parameter estimation step as a training signal.

By using the estimation result in the hidden parameter estimation step as a training signal, the constraint enforcement parameter can be automatically and simultaneously extracted along with the hidden parameter.

In another preferred embodiment of the present invention, each of the hidden parameters is expressed by a probability distribution.

By expressing each hidden parameter by a probability distribution, the tolerance for changes in the shapes of the object images and complicated motion of the object images increases.

Another preferred embodiment of the present invention further includes: a composite image synthesis step of receiving the background image and each object image, which are hidden parameters outputted in the output step, and newly synthesizing an image by superimposing each object image onto the received background image; an error calculation step of calculating an error between the image synthesized in the composite image synthesis step and each of the input images; and a number of image judgment step of increasing the number of input images when the error calculated in the error calculation step is equal to or greater than specified, and of causing processing of the hidden parameter estimation step and the constraint enforcement parameter learning step to be iteratively performed again using the increased input images, or, displaying to a user that the number of input images is insufficient.

Thus it is possible to determine the number of input images necessary for an appropriate extraction of hidden parameters.

In another preferred embodiment of the present invention, the output step further includes an image data division step of saving or outputting separately the background image and each object image, which are hidden parameters.

By holding the extracted background image and each object image separately, only necessary images are chosen and stored from the background image and the object images; by outputting these necessary images to the outside, the images can be effectively stored and outputted as graphics elements.

In another preferred embodiment of the present invention, in the image input step, plural image input arranged in time series is accepted, and the image processing method further includes: an intermediate time image synthesis step of: receiving the background image, the object images, the shapes of the object images, and the motion of the object images, which are hidden parameters outputted in the output step, synthesizing the object image within the intermediate time between input images using the background image, the object images, the shapes of the object images and the motion of the object images, and synthesizing an intermediate time image by superimposing the object image at the intermediate time onto the background image at the corresponding time.

Thus an intermediate time image can be synthesized using the extracted background image, object images, shape of each object image and the motion of each object image. Thus, it is possible to synthesize an image with a time resolution higher than the input image sequence.

In another preferred embodiment of the present invention, in the hidden parameter estimation step, the parameters of a point spread function are held, the parameters expressing the extent to which the image has been deteriorated as one hidden parameter, and by estimating the inverse function of the point spread function, the background image and the object images are synthesized with higher image quality than the input image.

Thus the background image and the object images can be extracted with a higher image quality than the input images.

Another preferred embodiment of the present invention further includes a pixel value interpolation step of receiving the background image and each object image, which are hidden parameters outputted in the output step, and when the reliability of the pixel values for the received background image and the object images is low, of interpolating the pixel values using pixel values in an adjacent area.

Thus, by performing interpolation using adjacent pixels when the pixel values of the background image and each object image to be extracted are undefined, the background image and each object image can be extracted with less noise.

Another preferred embodiment of the present invention further includes: an object display step of displaying the object images or the shapes of the object images, which are hidden parameters outputted in the output step, in a monitor, so as to allow a user to choose at least one of the displayed objects; and an image synthesis step of erasing the object that the user has selected by superimposing an object image which does not correspond to the object image or the shape of the object image chosen by the user onto the background image, and synthesizing an image in which the erased object area is embedded in the background image.

Thus, an unnecessary object image selected by the user can be erased with one touch and an image in which the erased area is embedded in the background image can be synthesized.

In another preferred embodiment of the present invention, a background image motion, which is caused by camera motion, is included as one of the hidden parameters.

Thus the background image that is adjusted for camera motion, at least two of the object images, the shape of each of the object images and the motion of each of the object images may be simultaneously extracted.

The following describes embodiments of the present invention with reference to the drawings.

First Embodiment

FIG. 1 is a diagram showing the structure of the image processing device in the first embodiment. The image processing device in FIG. 1 is a device that simultaneously extracts the following elements defined as hidden parameters from plural images in a reliable manner: a background image, at least two or more object images, the shape of each of the object images, and the motion of each of the object images. The image processing device includes an image input unit 101, a hidden parameter estimation unit 102, a constraint enforcement parameter learning unit 103, a complementary learning unit 104, and an output unit 105.

The image input unit 101 is a processing unit that accepts the input of plural images. Here, these plural images are not necessarily inputted in a time series.

The hidden parameter estimation unit 102 is a processing unit that defines, as hidden parameters, the background image, at least two or more object images, the shape of each of the object images, and the motion of each of the object images included in the inputted plural images, and estimates hidden parameters through iterative learning, based on the plural images and constraint enforcement parameters, each of which indicates at least one constraint on a hidden parameter.

The constraint enforcement parameter learning unit 103 is a processing unit that learns constraint enforcement parameters related to the hidden parameters, using, the estimation results obtained by the hidden parameter estimation unit 102 as training signals. In the present embodiment, the constraint enforcement parameter learning unit 103 learns constraint enforcement parameters related to objects, such as the size of each object image area, the color of each object image, the motion of pixels included in each object image, and the like. Since the constraint enforcement parameter learning unit 103 learns constraint enforcement parameters, using the estimation results obtained by the hidden parameter estimation unit 102 as training signals, it is possible for the constraint enforcement parameter learning unit 103 to carry out automatic learning of constraint enforcement parameters without requiring training signals. For this reason, there is no need to provide knowledge about a scene in advance, and thus there is no limit of applicable scenes.

The complementary learning unit 104 is a processing unit that causes the following operations to be iteratively performed: estimation of hidden parameters performed by the hidden parameter estimation unit 102 based on constraint enforcement parameters learned by the constraint enforcement parameter learning unit 103; and learning of constraint enforcement parameters performed by the constraint enforcement parameter learning unit 103 based on the results of hidden parameter estimation obtained by the hidden parameter estimation unit 102. More specifically, the complementary learning unit 104 sends, to the hidden parameter estimation unit 102, object-related constraint enforcement parameters learned by the constraint enforcement parameter learning unit 103. Then, the hidden parameter estimation unit 102 extracts hidden parameters again, using the constraint enforcement parameters sent from the complementary learning unit 104. By iteratively performing these operations, it is possible to simultaneously extract a background image, at least two or more object images, the shape of each of the object images, and the motion of each of the object images defined as hidden parameters, while avoiding local minima.

The output unit 105 is a processing unit that outputs the hidden parameters estimated by the hidden parameter estimation unit 102 after the iterative learning is carried out by the complementary learning unit 104. In other words, the output unit 105 outputs to the outside the background image, at least two or more object images, the shape of each of the object images, and the motion of each of the object images, which have been simultaneously extracted by the present image processing device, as the results of the processes performed by the present device.

Note that each of the constituent elements of the image processing device (the image input unit 101, the hidden parameter estimation unit 102, the constraint enforcement parameter learning unit 103, the complementary learning unit 104, and the output unit 105) may be implemented in the form of software such as a program executed on a computer having a CPU, a RAM, a ROM, an I/O port, a hard disk, a display, and the like, or may be implemented in the form of hardware such as an electronic circuit. The same applies to image processing devices in the other embodiments.

Referring to the flowchart of FIG. 2, the image processing method of the present invention will be described for an example case of extracting two objects. It should be noted that the following description is easily extensible also to the case of extracting three or more objects.

First, in S201, the image input unit 101 accepts plural input images.

Next, in S202, the hidden parameter estimation unit 102 estimates each hidden parameter. Here, referring to FIG. 3, hidden parameters are described. Assume that each input image x301 is composed of a noise β302, a background b303, an image $f_1$304 of an object 1, an image $f_2$305 of an object 2, motion $T_1$306 of the object 1, motion $T_2$307 of the object 2, a probability of shape $\pi_1$308 of the object 1, a probability of shape $\pi_2$309 of the object 1, a shape $m_1$310 of the object 1, and a shape $m_2$311 of the object 2. In other words, the noise β302, the background b303, the image $f_1$304 of the object 1, the image $f_2$305 of the object 2, the motion $T_1$306 of the object 1, the motion $T_2$307 of the object 2, the probability of shape $\pi_1$308 of the object 1, the probability of shape $\pi_2$309 of the object 2, the shape $m_1$310 of the object 1, and the shape $m_2$311 of the object 2 are all hidden parameters. When the present method is extended to extracting three or more objects, an image $f_i$ of an object, a probability of shape $\pi_i$ of the object, motion $T_i$ of the object, and a shape $m_i$ of the object are simply added. Meanwhile, when taking camera motion into account, the present method is handled in the same manner as when there is a larger number of objects. As shown in FIG. 4, motion $T_b$401 of a camera, a probability of shape $\pi_b$402 of a background, and a shape $m_b$403 of the background are simply added as hidden parameters to the structure shown in FIG. 3. Next, referring back to FIG. 3, a method of finding hidden parameters will be described in detail. Here, the method described in Non-patent document 2, which is one of the variational approximation methods, is used to describe the method for estimating hidden parameters. However, since only an intermediate result of the hidden parameter estimation is required, any method may be used as long as it is a method of estimating hidden parameters through iterative learning.

Figure 4:
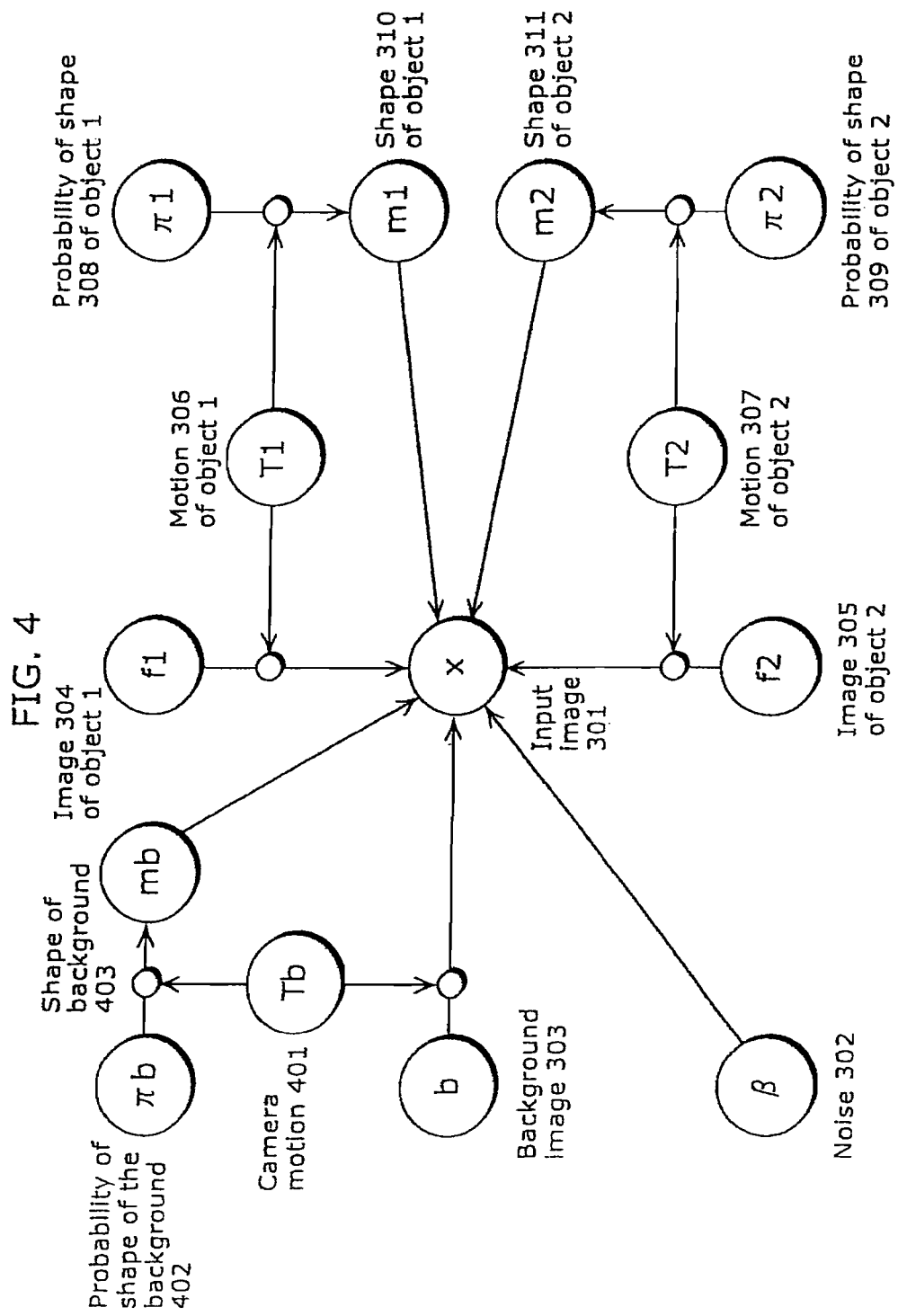
FIG. 4 is a diagram showing example processes performed by the hidden parameter estimation unit according to the first embodiment of the present invention.

The structure shown in FIG. 3 can be expressed as the following Equations 1 to 3:

$$P(x,f,b,\beta,\pi,T,m)=P(x|f,b,\beta,T,m)P(m|\pi,T)P(f)P(b)P(\beta)P(T)P(\pi) \quad \text{Equation 1}$$

Assuming that each input image x301 is modeled as a Gaussian distribution, it can be expressed as:

$$P(x_k|b,f,m,T,\beta)=N(x_k|(T_2f_2)_k,\beta_{f2}^{-1})^{\delta(m=2)}N(x_k|(T_1f_1)_k,\beta_{f1}^{-1})^{\delta(m=1)}N(x_k|b_k,\beta_b^{-1})^{\delta(m=0)} \quad \text{Equation 2}$$

In this equation, N denotes a Gaussian distribution, and δ(m=i) denotes a delta function. The shape m of each object is expressed in binary form since only shape information is held.

$$P(m|\pi,T)=(T_2\pi_2)_k^{\delta(m=2)}\{T_2(1-\pi_2)\}_k^{\delta(m=1 \cap m=0)}(T_1\pi_1)_k^{\delta(m=1)}\{T_1(1-\pi_1)\}_k^{\delta(m=0)} \quad \text{Equation 3}$$

Here, δ(m=i) denotes a delta function. It is indicated here that the shape $m_2$311 of the object 2 is at a position closest to the camera.

Although the present embodiment is described with the assumption that the noise β302 is modeled as a Gamma distribution, the background b303, the image f$_1$304 of the object 1 and the image f$_2$305 of the object 2 are each modeled as a Gaussian distribution, the motion T$_1$306 of the object 1, the motion T$_2$307 of the object 2, the shape m$_1$310 of the object 1, and the shape m$_2$311 of the object 2 are each modeled as a discrete distribution, and the probability of shape π$_1$308 of the object 1 and the probability of shape π$_2$309 of the object 2 are each modeled as a Beta distribution, they are not limited to be modeled as these distributions, and thus update equations appropriate for the types of distributions assumed may be simply derived.

The method described on page 3 of Non-patent document 2 defines the following relational expression, taking that Q is the distribution of each hidden parameter to be obtained and H is the representation of all hidden parameters.

$$\ln Q(H_j) = <\ln P(H, x)>\prod_{i \neq j} Q(H_i) + const. \qquad \text{Equation 4}$$

In this equation, $$<\ln P(H, x)>\prod_{i \neq j} Q(H_i)$$

denotes an expected value of lnP(H,x), from which Q(H$_i$), which is related to the distribution of each hidden parameter itself, is excluded. Note that lnP(H,x), which is equivalent to a logarithm of Equation 1, can be expanded as the following equation, using Equation 2 and Equation 3:

$$\ln P(x, f, b, \beta, T, m) = \qquad \text{Equation 5}$$
$$\ln\{P(x \mid f, b, \beta, T, m)P(m \mid \pi, T)P(f)P(b)P(\beta)P(T)P(\pi)\} =$$
$$\sum_k \delta(m=2)\left\{-\frac{1}{2}\beta_{f2}(x_k - (T_2 f_2)_k)^2 + \frac{1}{2}(\log\beta_{f2} - \log 2\pi) + (T_2\log\pi_2)_k\right\} + \sum_k \delta(m=1)\{-$$
$$\frac{1}{2}\beta_{f1}(x_k - (T_1 f_1)_k)^2 + \frac{1}{2}(\log\beta_{f1} - \log 2\pi) + (T_1\log\pi_1)_k +$$
$$(T_2\log(1-\pi + \sum_k \delta(m=0)\left\{-\frac{1}{2}\beta_b(x_k - b_k)^2 + \frac{1}{2}(\log\beta_b - \log 2\pi) + (T_1\log(1-\pi_1))_k +$$
$$(T_2\log(1-\pi_2 + \ln P(f) + \ln P(b) + \ln P(\beta) +$$
$$\ln P(T) + \ln P(\pi)$$

From the relationship between Equation 4 and Equation 5, an update equation to obtain each hidden parameter can be derived. By defining updates that are performed using Equation 6 through to Equation 26 as one update, it is possible to estimate each hidden parameter by iteratively performing the update.

First, a method for estimating the noise β302 is described. The following describes the case where different noises are assumed to be included in the background b303, the image f$_1$304 of the object 1, and the image f$_2$305 of the object 2. Since the noise β302 is assumed to be modeled as a Gamma distribution, Gamma distribution parameters to be obtained for the background b303, the image f$_1$304 of the object 1, and the image f$_2$305 of the object 2 are represented as (u$_{β\_b}$, v$_{β\_b}$),(u$_{β\_f1}$,v$_{β\_f1}$),(u$_{β\_f2}$,v$_{β\_f2}$), respectively. The obtainment of these parameters corresponds to the estimation of the hidden parameters. Also, (u$_{β\_b}$,v$_{β\_b}$),(u$_{β\_f1}$,v$_{β\_f1}$),(u$_{β\_f2}$,v$_{β\_f2}$) have a set of parameter values for each input image. In other words, a set of hidden parameters of the number of inputs related to the noise β302 is obtained for each input image. The parameters of the noise β302 of the background b303 are obtained using the update equations described below. Note that <ϑ> denotes an expected value of ϑ.

$$v_{β\_b}^{t+1} = v_{β\_b}^t + \frac{1}{2}<(1 - m_1 - m_2)(x - b)^2> \qquad \text{Equation 6}$$

$$u_{β\_b}^{t+1} = u_{β\_b}^t + \frac{1}{2}<1 - m_1 - m_2> \qquad \text{Equation 7}$$

The parameters of the noise β302 of the image f$_1$304 of the object 1 are represented as follows:

$$v_{β\_f1}^{t+1} = v_{β\_f1}^t + \frac{1}{2}<m_1(x - T_1 f_1)^2> \qquad \text{Equation 8}$$

$$u_{β\_f1}^{t+1} = u_{β\_f1}^t + \frac{1}{2}<m_1> \qquad \text{Equation 9}$$

The parameters of the noise β302 of the image f$_2$305 of the object 2 are estimated using the following update equations:

$$v_{β\_f2}^{t+1} = v_{β\_f2}^t + \frac{1}{2}<m_2(x - T_2 f_2)^2> \qquad \text{Equation 10}$$

$$u_{β\_f2}^{t+1} = u_{β\_f2}^t + \frac{1}{2}<m_2> \qquad \text{Equation 11}$$

As described above, by repeating the parameter updates using Equation 6 through to Equation 11, the parameters of the noise β302 are obtained.

Next, an estimation method for use by the hidden parameter estimation unit 102 in estimating the parameters of the background b303, the image f$_1$304 of the object 1, and the image f$_2$305 of the object 2 will be described. Here, it is assumed that the background b303, the image f$_1$304 of the object 1, and the image f$_2$305 of the object 2 are modeled as Gaussian distributions, and that their respective Gaussian distribution parameters (u,v) to be obtained are represented as (u$_{f2}$,v$_{f2}$),(u$_{f1}$,v$_{f1}$),(u$_b$,v$_b$). Each of (u$_{f2}$,v$_{f2}$),(u$_{f1}$,v$_{f1}$),(u$_b$,v$_b$) corresponds to one pixel, and thus by calculating (u$_{f2}$,v$_{f2}$), (u$_{f1}$,v$_{f1}$),(u$_b$,v$_1$) for the number of pixels in the respective images, the images of each of the background b303, the image f$_1$304 of the object 1, and the image f$_2$305 of the object 2 are estimated from the plural input images.

The parameters of the background b303 are estimated using the following update equations:

$$u'_b v'_b = u_b v_b + <β_b(1 - m_1 - m_2)x> \qquad \text{Equation 12}$$

$$v'_b = v_b - <β_b(1 - m_1 - m_2)> \qquad \text{Equation 13}$$

The Gaussian distribution parameters (u$_b$,v$_b$) of the background b303 can be obtained using Equation 12 and Equation 13, respectively.

Similarly, the parameters of the image $f_1$ 304 of the object 1 are estimated using the following update equations:

$$u'_{f1}v'_{f1} = u_{f1}v_{f1} + <\beta_{f1}T_1^{-1}(m_1 x)> \qquad \text{Equation 14}$$

$$v'_{f1} = v_{f1} + <\beta_{f1}T_1^{-1}m_1> \qquad \text{Equation 15}$$

The parameters of the image $f_1$ 304 of the object 1 can be obtained in the same way. The parameters of the image $f_2$ 305 of the object 2 are also obtained using the following update equations:

$$u'_{f2}v'_{f2} = u_{f2}v_{f2} + <\beta_{f2}T_2^{-1}(m_2 x)> \qquad \text{Equation 16}$$

$$v'_{f2} = v_{f2} + <\beta_{f2}T_2^{-1}m_2> \qquad \text{Equation 17}$$

As described above, by repeating the parameter updates using Equation 12 through to Equation 17, the respective hidden parameters of the background b303, the image $f_1$304 of the object 1, and the image $f_2$305 of the object 2 are obtained.

Next, an estimation method for use by the hidden parameter estimation unit 102 in estimating the parameters of the motion $T_1$306 of the object 1 and the motion $T_2$307 of the object 2 will be described. Here, it is assumed that the motion $T_1$306 of the object 1 and the motion $T_2$307 of the object 2 are modeled as discrete distributions. $T_1$ and $T_2$ respectively indicate the pixels in the next image to which the pixels of the image $f_1$304 of the object 1 and the image $f_2$305 of the object 2 move. In other words, motion for all input images are estimated. The parameter updates are carried out as follows:

$$\log T_1 = <m_1 \log \pi_1> + <(1 - m_1 - m_2)\log(1 - \pi_1)> \qquad \text{Equation 18}$$
$$+ <\beta_{f1}\left\{f_1(m_1 x) - \frac{1}{2}f_1^2 m_1\right\}>$$

$$\log T_2 = <m_2 \log \pi_2> \qquad \text{Equation 19}$$
$$+ <(1 - m_2)\log(1 - \pi_2)> + <\beta_{f2}\left\{f_2(m_2 x) - \frac{1}{2}f_2^2 m_2\right\}>$$

As described above, by repeating the parameter updates using Equation 18 and Equation 19, the motion $T_1$306 of the object 1 and the motion $T_2$307 of the object 2 are estimated.

Next, an estimation method for use by the hidden parameter estimation unit 102 in estimating the parameters of the probability of shape $\pi_1$308 of the object 1 and the probability of shape $\pi_2$309 of the object 2 will be described. Here, it is assumed that the probability of shape $\pi_1$308 of the object 1 and the probability of shape $\pi_2$309 of the object 2 are modeled as Beta distributions, and that their respective Beta distribution parameters (u,v) to be obtained are represented as $(u_{\pi 2}, v_{\pi 2}),(u_{\pi 1},v_{\pi 1})$. Each of $(u_{\pi 2},v_{\pi 2}),(u_{\pi 1},v_{\pi 1})$ corresponds to one pixel, and thus by calculating $(u_{\pi 2},v_{\pi 2}),(u_{\pi 1},v_{\pi 1})$ for the number of pixels in the respective images, the image of each of the probability of shape $\pi_1$308 of the object 1 and the probability of shape $\pi_2$309 of the object 2 is estimated.

The parameters of the probability of shape $\pi_1$308 of the object 1 are estimated using the following update equations:

$$u'_{\pi 1} = u_{\pi 1} + <T_1^{-1}m_1> \qquad \text{Equation 20}$$

$$v'_{\pi 1} = v_{\pi 1} + <(1 - T_1^{-1}(m_1 + m_2)> \qquad \text{Equation 21}$$

Similarly, the parameters for the probability of shape $\pi_2$309 of the object 2 are estimated as follows:

$$u'_{\pi 2} = u_{\pi 2} + <T_2^{-1}m_2> \qquad \text{Equation 22}$$

$$v'_{\pi 2} = v_{\pi 2} + <(1 - T_2^{-1}m_2)> \qquad \text{Equation 23}$$

As described above, by repeating the parameter updates using Equation 20 through Equation 23, the respective hidden parameters of the probability of shape $\pi_1$308 of the object 1 and the probability of shape $\pi_2$309 of the object 2 are estimated.

Next, an estimation method for use by the hidden parameter estimation unit 102 in estimating the parameters of the shape $m_1$310 of the object 1 and the shape $m_2$311 of the object 2 will be described. It is assumed that shape $m_1$310 of the object 1 and the shape $m_2$311 of the object 2 are modeled as discrete distributions. Here, object shape information for the number of input images is held as the shape $m_1$310 of the object 1 and the shape $m_2$311 of the object 2. The parameter updates are carried out as follows:

$$\log m_1 = <-\frac{1}{2}\beta_{f1}(x - T_1 f_1)^2 + \qquad \text{Equation 24}$$
$$\frac{1}{2}(\log \beta_{f1} - \log 2\pi) + T_1 \log \pi_1 + T_2 \log(1 - \pi_2)>$$

$$\log m_2 = < \qquad \text{Equation 25}$$
$$-\frac{1}{2}\beta_{f2}(x - T_2 f_2)^2 + \frac{1}{2}(\log \beta_{f2} - \log 2\pi) + T_2 \log \pi_2 >$$

$$\log(m_b) = <-\frac{1}{2}\beta_b(x - b)^2 + \qquad \text{Equation 26}$$
$$\frac{1}{2}(\log \beta_b - \log 2\pi) + T_1 \log(1 - \pi_1) + T_2 \log(1 - \pi_2)>$$

Here, the shape $m_1$310 of the object 1 and the shape $m_2$311 of the object 2 may be obtained using the above Equation 24 and Equation 25, or alternatively, the shape $m_1$310 of the object 1 and the shape $m_2$311 of the object 2 may be obtained after normalizing the parameters under the constraint represented as the following equation, using Equation 26:

$$m_b + m_1 + m_2 = 1 \qquad \text{Equation 27}$$

As described above, each of the hidden parameters can be estimated through variational approximation-based iterative learning, as shown in Equation 6 through to Equation 26.

Figure 5:
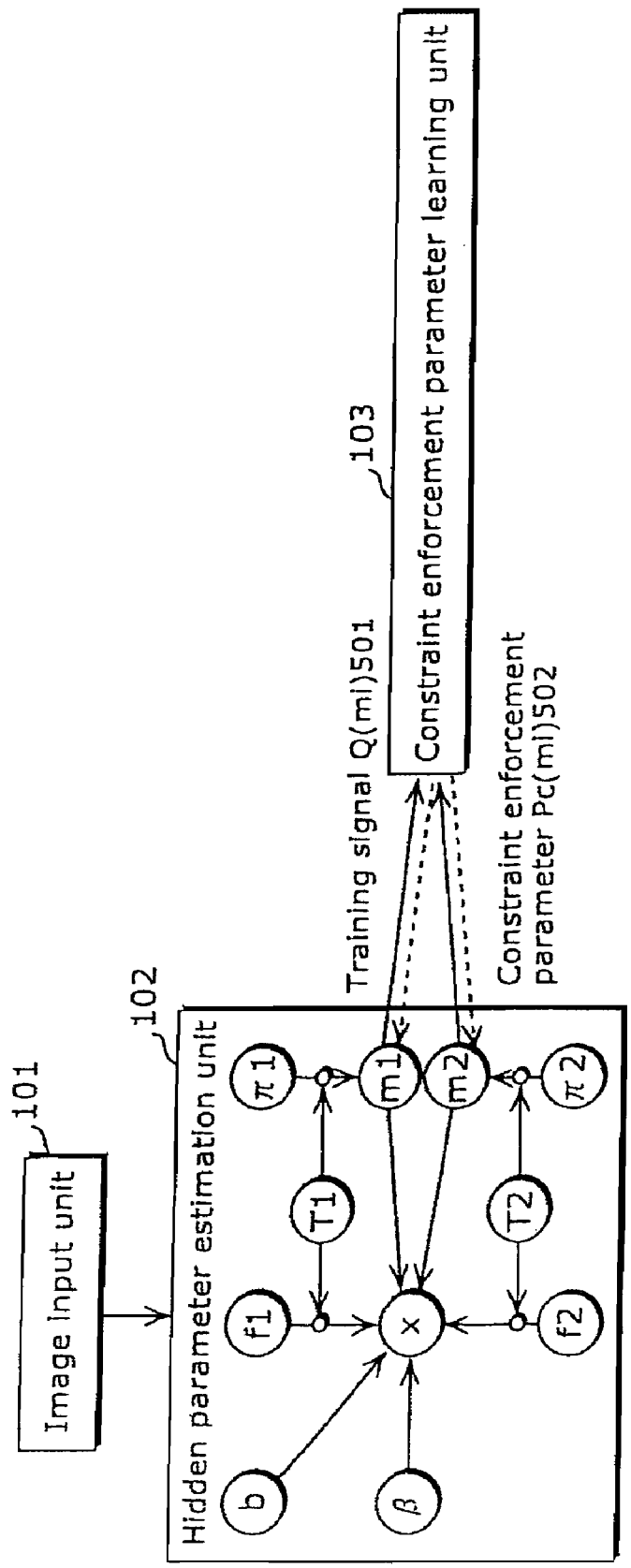
FIG. 5 is a diagram showing example processes performed by a complementary learning unit according to the first embodiment of the present invention.

Next, in Step S203, the hidden parameter estimation unit 102 sends the results of hidden parameter estimation obtained in S202 to the constraint enforcement parameter learning unit 103 as shown in FIG. 5. Although the following describes a case where the shape $m_1$310 of the object 1 and the shape $m_2$311 of the object 2, which are some of the hidden parameters, are used for learning constraint enforcement parameters, the learning is not limited to being carried out using the shapes of the objects, and thus any of the other hidden parameters described above may be used.

Next, in S204, the constraint enforcement parameter learning unit 103 learns constraint enforcement parameters using, the results of the hidden parameter estimation sent in S203 as training signals. The present embodiment describes the case where the estimated hidden parameters of the shape $m_1$310 of the object 1 and the shape $m_2$311 of the object 2 are used as training signals $Q(m_i)$ 501 to learn the constraint enforcement parameters related to the shape $m_1$310 of the object 1 and the shape $m_2$311 of the object 2. First, the probability $p_c(m=1|x)$ that the shape of the object 1 is the shape $m_1$310 and a probability $p_c(m=2|x)$ that the shape of the object 2 is the shape $m_2$311 are newly defined as constraint enforcement parameters. In other words, the constraint enforcement parameter learning unit learns each constraint enforcement parameter $p_c(m_i|x)$, in addition to the hidden parameters estimated by the hidden parameter estimation unit.

The constraint enforcement parameters $p_c(m_i|x)$ of the shape $m_1$ 310 of the object 1 and the shape $m_2$ 311 of the object 2 are represented respectively as follows:

$$p_c(m = 1 \mid x) = \exp(-w_1^T \Psi) \quad \text{Equation 28}$$

$$p_c(m = 2 \mid x) = \exp(-w_2^T \Psi) \quad \text{Equation 29}$$

$$p_c(m = 0 \mid x) = \frac{1}{Z} \quad \text{Equation 30}$$

In this equation, $p_c(m=0|x)$ relates to the background, and z is a normalized constant, which can be represented as follows:

$$z = \exp(-w_1^T \Psi) + \exp(-w_2^T \Psi) + 1 \quad \text{Equation 31}$$

In this equation, $\Psi$ denotes an input vector to be used when obtaining a constraint enforcement parameter. For example, pixel position information for representing the size of an object, pixel color information for representing the color of an object, and pixel motion information for representing the motion of an object correspond to $\Psi$. The details of this will be described later.

Next, based on Equation 28 to Equation 30, $L_1(m)$ can be represented as:

$$L_1(m) = <\{p(m=0|x)\}^{\delta(m=0)} \{p(m=1|x)\}^{\delta(m=1)} \{p(m=2|x)\}^{\delta(m=2)}>_{Q(m)} \quad \text{Equation 32}$$

Then, a logarithm of $L_1(m)$ is represented as:

$$\log L_1(m) = <\delta(m=1)\{-w_1\Psi - \log Z\} + \delta(m=2)\{-w_2\Psi - \log Z\} + \delta(m=0)\{-\log Z\}>_{Q(m)} \cong Q(m=1)\{-w_1\Psi\} + Q(m=2)\{-w_2\Psi\} - \log Z \quad \text{Equation 33}$$

In this equation, $Q(m_i)$ denotes a result of hidden parameter estimation sent from the hidden parameter estimation unit 102 in S203. Then, by deriving the values of $w_1, w_2$ which produce the minimum value of $\log L_1(m)$ in Equation 33, the constraint enforcement parameter learning unit 103 learns the constraint enforcement parameters represented as Equation 28 through Equation 30. As an example, a method for deriving the value of $w_1$ is described.

$$\frac{\partial \log L_1(m)}{\partial w_1} \cong Q(m=1)\{-\Psi\} - \frac{1}{Z}(-\Psi)\exp(-w_1\Psi) \quad \text{Equation 34}$$

$$= (-\Psi)\{Q(m=1) - p(m=1 \mid x)\}$$

When the value of $w_1$ at which $$\frac{\partial \log L_1(m)}{\partial w_1}$$

in Equation 34 is calculated at zero, this also means that the constraint enforcement parameter $p_c(m_i|x)$ 502 is the same as the $Q(m_i)$ 501 that is estimated by the hidden parameter estimation unit. In other words, the constraint enforcement parameter $p_c(m_i|x)$ 502 is learned using the $Q(m_i)$ 501 as a training signal. Furthermore, Equation 34 provides an advantage in that the learning of constraint enforcement parameters is automatically carried out without providing the knowledge about a scene in advance. As a result, therefore, there is no limit of applicable image scenes.

A specific example of calculating the value of $w_1$ is provided below. Here, an example case of using the Newton-Raphson method will be described, but another energy minimization method that produces the minimum value of $$\frac{\partial \log L_1(m)}{\partial w_1}$$

in Equation 34 may also be used.

Alternatively, constraint enforcement parameters to be learned may be described in the constraint enforcement parameter learning unit 103 as hidden parameters as in the case of the hidden parameter estimation unit 102, such that the constraint enforcement parameter learning unit 103 learns the described constraint enforcement parameters. This will be described in the sixth embodiment.

Assuming that a function to be minimized is represented as the following equation, and that M×N denotes the size of the image:

$$f(w_1) = \sum_i^{MN} \{Q_i(m=1) - p_{c\_i}(m=1 \mid x)\}^2 \quad \text{Equation 35}$$

Then, the following are derived using the Newton-Raphson method:

$$f'(w_1) \cong f'(w_1^t) + H(w_1^t)(w_1 - w_1^t) = 0 \quad \text{Equation 36}$$

$$w_1^{t+1} = w_1^t - \frac{g(w_1^t)}{H(w_1^t)} \quad \text{Equation 37}$$

The calculation of $w_1$ is done in the above manner. Note that in the Equation 37, $g(w'_1)$ denotes a first-order differential, and $H(w'_1)$ denotes a Hessian. Through the above processes, the constraint enforcement parameters $p_c(m_i|x)$ 502 represented as Equation 28 through Equation 30 can be estimated.

The value of $w_2$ is calculated in the same manner, and thus its description is not repeated.

Here, a specific example is provided of an input vector used in Equation 28 and Equation 29 for obtaining constraint enforcement parameters. For example, when using pixel position information for representing the size of an object, $\Psi$ is represented as the following equation:

$$\Psi = \begin{bmatrix} 1 \\ a \\ b \\ ab \\ a^2 \\ b^2 \end{bmatrix} \quad \text{Equation 38}$$

In this equation, 1 denotes a bias term, and a,b denote pixel position values obtained from an input image.

When used to represent pixel color information of an object, $\Psi$ is represented as the following equation:

$$\Psi = \begin{bmatrix} c_1 \\ c_2 \\ \vdots \\ c_K \end{bmatrix}$$ Equation 39

In this equation, the color values of the respective pixels obtained from an input image may be used to represent $c_1$, $c_2$, ... $c_K$, or the color values obtained from the input image may be mapped onto the space represented by K multi-dimensional Gaussian distributions, so as to use a distance between the mean value of each of the Gaussian distributions as an input vector. This method is described in detail on page 372 in Non-patent document 4 (Andrew Webb "Statistical Pattern Recognition Second Edition" JOHN WILEY & SONS, LTD).

When used to represent pixel motion information, $\Psi$ is represented as the following equation:

$$\Psi = \begin{bmatrix} f_{x1} \\ f_{y1} \\ \vdots \\ f_{xK} \\ f_{yK} \end{bmatrix}$$ Equation 40

In this equation, $f_{x1}, f_{y1}, \ldots f_{xK}, f_{yK}$ denote motion vectors of the respective pixels in an image. Alternatively, motion vectors extracted by using the tracking technique described in Non-patent document 5 (Jianbo Shi and Carlo Tomasi, "Good Features to Track", IEEE Conference on Computer Vision and Pattern Recognition, pp. 593-600, 1994) may also be used.

When learning constraint enforcement parameters, it is also possible to use a combination of plural information described above. For example: plural input vectors indicated in Equation 38 through Equation 40 may be processed as one concatenated vector; Equation 28 through Equation 30 may be defined for each type of input information so as to estimate constraint enforcement parameters for each of such input information; and weight may be assigned to constraint enforcement parameters for each type of input information.

Here, variations of Equation 28 and Equation 29 will be described. First, the constraint enforcement parameter learning unit 103 selects from an image two pixels which form a pair. Next, the constraint enforcement parameter learning unit 103 determines whether each of the pixels belongs to the shape $m_1$ 310 of the object 1, the shape $m_2$ 311 of the object 2, or the other background, so as to learn different constraint enforcement parameters depending on whether these pixels belong to a different object or to the same object.

Here, assuming that a constraint enforcement parameter is represented as $p'_c(m_i|x)$, the constraint enforcement parameter of the object 1 and the constraint enforcement parameter of the object 2 are represented as the following equations, respectively:

$$p'_c(m_i = 1 \mid x) = p_c(m_i = 1 \mid x) + \sum_j p(m_i = 1, m_j \mid x)$$ Equation 41

$$p'_c(m_i = 2 \mid x) = p_c(m_i = 2 \mid x) + \sum_j p(m_i = 2, m_j \mid x)$$ Equation 42

In the above equation, j denotes a neighboring pixel of the pixel i.

Using object information of an object to which neighboring pixels belong, it is possible to decrease independence between pixels, and thus to separate and extract plural objects in a more efficient manner.

The following describes an example using a constraint enforcement parameter $p_c(m_i|x)$, but $p'_c(m_i|x)$ may be used instead of $p_c(m_i|x)$.

Next, in S205, the complementary learning unit 104 sends the constraint enforcement parameters $p_c(m_i|x)$ 502 to the parameter estimation unit 102, as shown in FIG. 5. Then, the same process as that of S202 is performed. Here, the constraint enforcement parameters $p_c(m_i|x)$ act as constraints for obtaining the shape $m_1$ 310 of the object 1 and the shape $m_2$ 311 of the object 2. More specifically, the following equations are used instead of Equation 24 and Equation 25:

$$\log m_1 = <-\frac{1}{2}\beta_{f1}(x-T_1f_1)^2 + \frac{1}{2}(\log\beta_{f1} - \log 2\pi) +$$

$$T_1\log\pi_1 + T_2\log(1-\pi_2) > + \log p_c(m_1 \mid x)$$ Equation 43

$$\log m_2 = <-\frac{1}{2}\beta_{f2}(x-T_2f_2)^2 +$$

$$\frac{1}{2}(\log\beta_{f2} - \log 2\pi) + T_2\log\pi_2 > + \log p_c(m_2 \mid x)$$ Equation 44

These equations enable the hidden parameter estimation unit 102 to estimate hidden parameters, while avoiding local minima. Although the above description has been given of the case where the constraint enforcement parameters of the shape $m_1$ 310 of the object 1 and the shape $m_2$ 311 of the object 2 are learned, it is possible to add constraint enforcement parameters also to other hidden parameters as in the case of Equation 43 and Equation 44. Moreover, even in the case where constraint enforcement parameters are added only to the shape $m_1$ 310 of the object 1 and the shape $m_2$ 311 of the object 2 in order to simultaneously optimize all hidden parameters, the hidden parameter estimation unit 102 is capable of extending the effect of avoiding local minima to other hidden parameters as well. Accordingly, it is possible to estimate hidden parameters while avoiding local minima without having to directly add constraint enforcement parameters to the background b303, the image $f_1$ 304 of the object 1, the image $f_2$ 305 of the object 2, the motion $T_1$ 306 of the object 1, and the motion $T_2$ 307 of the object 2, which are hidden parameters to be obtained.

Figure 6:
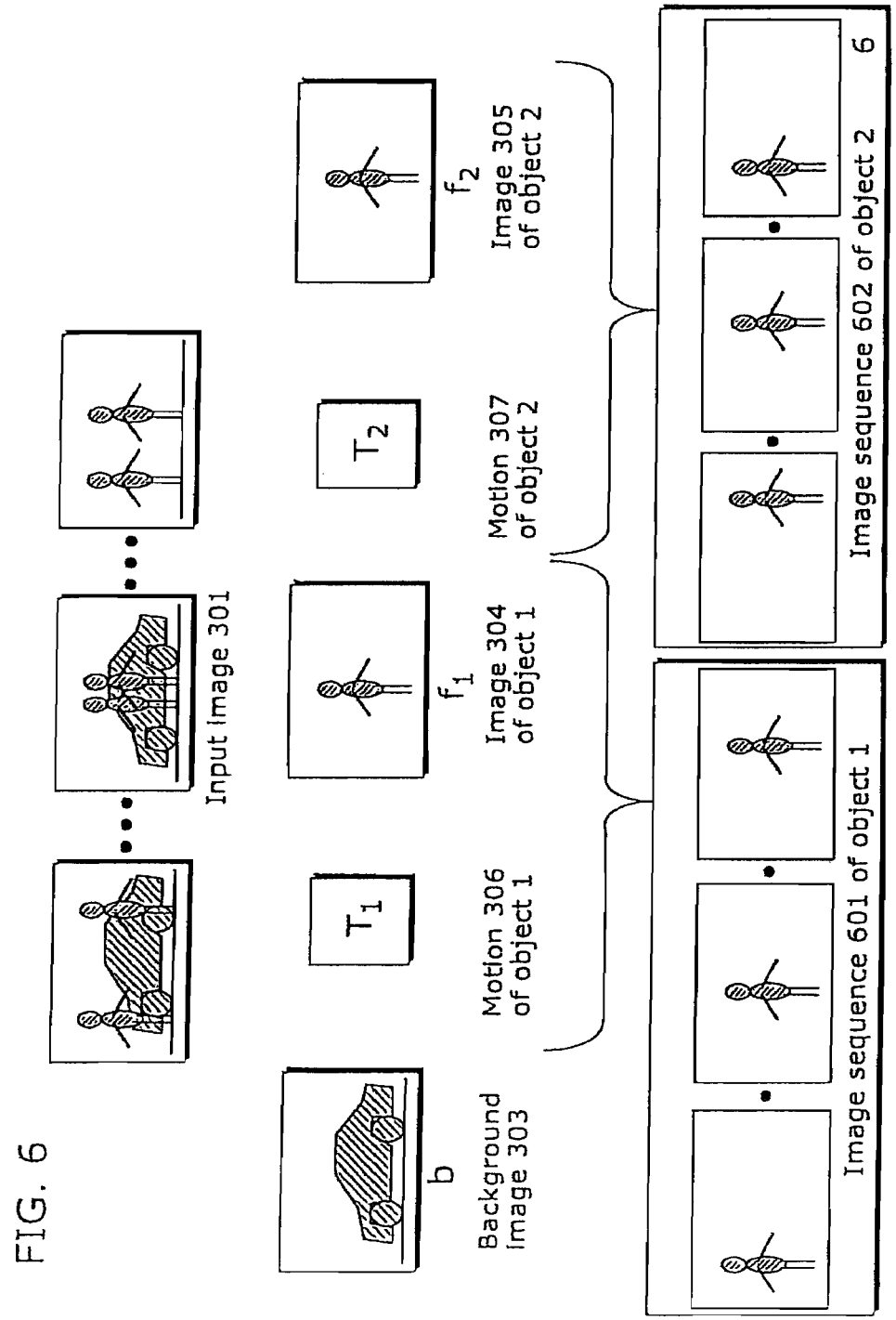
FIG. 6 is a diagram showing results of hidden parameter estimation according to the first embodiment of the present invention.

Lastly, after the hidden parameter estimation unit 102 and the constraint enforcement parameter learning unit 103 repeat the processes from S202 to S205 for an N predetermined number of times under the control of the complementary learning unit 104, the output unit 105 outputs, in S206, the results of estimations by the hidden parameter estimation unit 102 as images. FIG. 6 shows an example of the background b303, the image $f_1$ 304 of the object 1, and the image $f_2$ 305 of the object 2, which have been obtained from input images 301. The background b303, the image $f_1$ 304 of the object 1, and the image $f_2$ 305 of the object 2 are determined based on the respective Gaussian distribution parameters $(u_{f2}, v_{f2}), (u_{f1}, v_{f1}), (u_b, v_b)$, which are obtained for each pixel through the calculations from Equation 12 through Equation 17. More specifically, $u_{f2}, u_{f1}, u_b$, which are the mean values of the Gaussian distributions, are used as the respective pixel values.

Here, as shown in FIG. 6, an example of background b303, an example of the image f$_1$304 of the object 1, and an example of the image f$_2$305 of the object 2 are synthesized from the plural input images. For this reason, an image sequence 601 of the object 1 and an image sequence 602 of the object 2 corresponding to the respective input images are synthesized using Tf. More specifically, the image sequence 601 and the image sequence 602 are synthesized by shifting the pixels of the synthesized image f$_1$304 of the object 1 and image f$_2$305 of the object 2, based on the motion T$_1$306 of the object 1 and the motion T$_2$307 of the object 2, respectively. Note that the estimated shape m$_1$310 of the object 1 and shape m$_2$311 of the object 2 may be applied to images which have been synthesized using Tf. In this case, since this application is equivalent to masking the images using shape information, a noise removal effect can be expected.

With the above structure, it is possible to simultaneously estimate, from plural images, a background image, at least two or more object images, the shape of each of the object images, and the motion of each of the object images.

Moreover, by providing an image data division unit 701 in the output unit 105 as shown in the image processing device according to the first variation of the first embodiment of the present invention in FIG. 7, it is possible for the output unit 105 to separately store or output (transfer) the background b303, the image sequence 601 of the object 1, and the image sequence 602 of the object 2 to the outside. With reference to the flowchart in FIG. 8, it is explained that the output unit 105 separately transfers, in S801, one image of the background b303, the image sequence 601 of the object 1, and the image sequence 602 of the object 2. This makes it possible to reduce background area information equivalent to that included in N-1 images, where N is the number of input images when using a fixed camera. Meanwhile, in the case where only object motion is important such as in the case of a motion analysis device and a motion monitoring device, it is possible to transfer only the image sequence 601 of the object 1 and the image sequence 602 of the object 2. As thus described, storage and transfer of images can be efficiently carried out.

Next, a description is given of an image processing device according to the second variation of the first embodiment of the present invention. The second variation is an embodiment obtained by adding a function of determining the number of input images in the first embodiment.

In the image processing method described in the first embodiment, the number of input images required to appropriately extract hidden parameters depends greatly on image scenes, and thus it is not easy to determine the number of input images in advance. For example, it is not possible to extract an appropriate background image when plural input images include objects with little motion. For this reason, it is necessary to determine an appropriate number of images, depending on input images.

Figure 9:
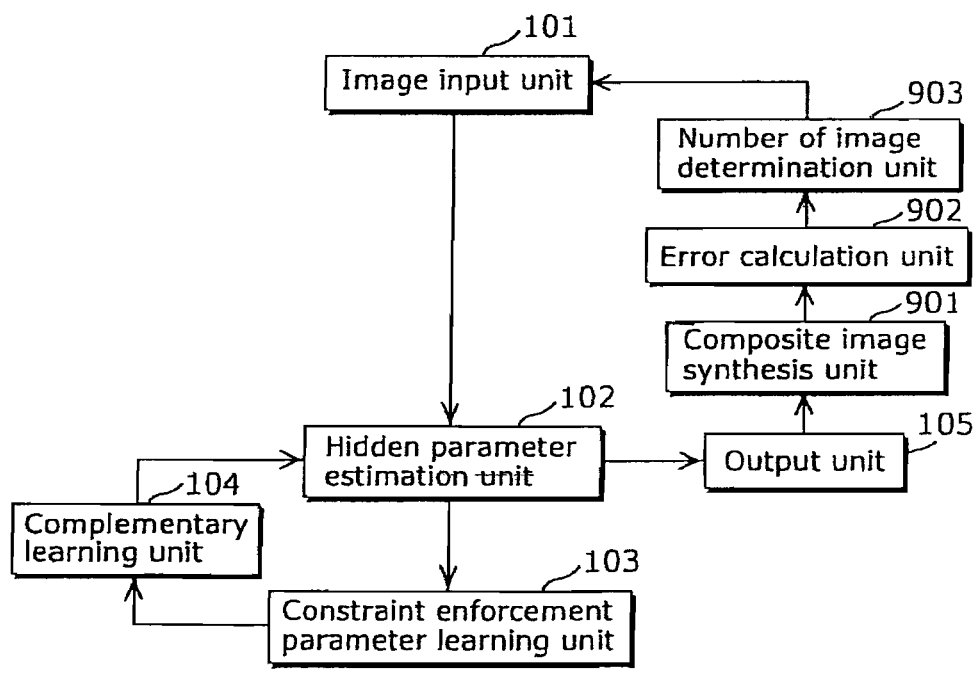
FIG. 9 is a diagram showing an example structure of an image processing device according to a second variation of the first embodiment of the present invention.

FIG. 9 shows an outline of the processes performed in the second variation of the first embodiment. The image processing device of the second variation is a device which has a function of determining an appropriate number of images depending on the input images, in addition to the functions of the image processing device of the first embodiment, and includes an image input unit 101, a hidden parameter estimation unit 102, a constraint enforcement parameter learning unit 103, a complementary learning unit 104, an output unit 105, a composite image synthesis unit 901, an error calculation unit 902, and a number of image determination unit 903. Since the constituent elements from the image input unit 101 to the output unit 105 are the same as those in the first embodiment, their descriptions will not be repeated.

As shown in FIG. 6, the hidden parameter estimation unit 102 synthesizes the image sequence 601 of the object 1 and the image sequence 602 of the object 2 according to the respective input images, based on the background b303, the image f$_1$304 of the object 1, and the image f$_2$305 of the object 2, which are extracted as hidden parameters, as well as based on the motion T$_1$306 of the object 1 and the motion T$_2$307 of the object 2. Of course, the shape m$_1$310 of the object 1 and the shape m$_2$311 of the object 2 estimated by the hidden parameter estimation unit 102 may be applied to the synthesized images.

The composite image synthesis unit 901 is a processing unit that accepts the background image and the respective object images, which are hidden parameters outputted from the hidden parameter estimation unit 102 via the output unit 105, and synthesizes a new image by superimposing the respective object images on the received background image. In the present embodiment, the composite image synthesis unit 901 synthesizes the same number of composite images as the number of input images, using the background b303, the image sequence 601 of the object 1, and the image sequence 602 of the object 2.

The error calculation unit 902 is a processing unit that calculates an error between each input image and each composite image synthesized by the composite image synthesis unit 901.

The number of image determination unit 903 is a processing unit that causes the hidden parameter estimation unit 102 and the constraint enforcement parameter learning unit 103 to repeat their processes, using an increased number of input images, when an error calculated by the error calculation unit 902 is equal to or greater than a predetermined value. The number of image determination unit 903 compares the calculated error value with the predetermined value, and in the case where the calculated error value is greater than the predetermined value, sends, to the input image unit 101, a signal for causing the processes to be performed again with an increased number of images. Meanwhile, when the calculated error value is smaller than the predetermined value, the number of image determination unit 903 ends the process.

Figure 11:
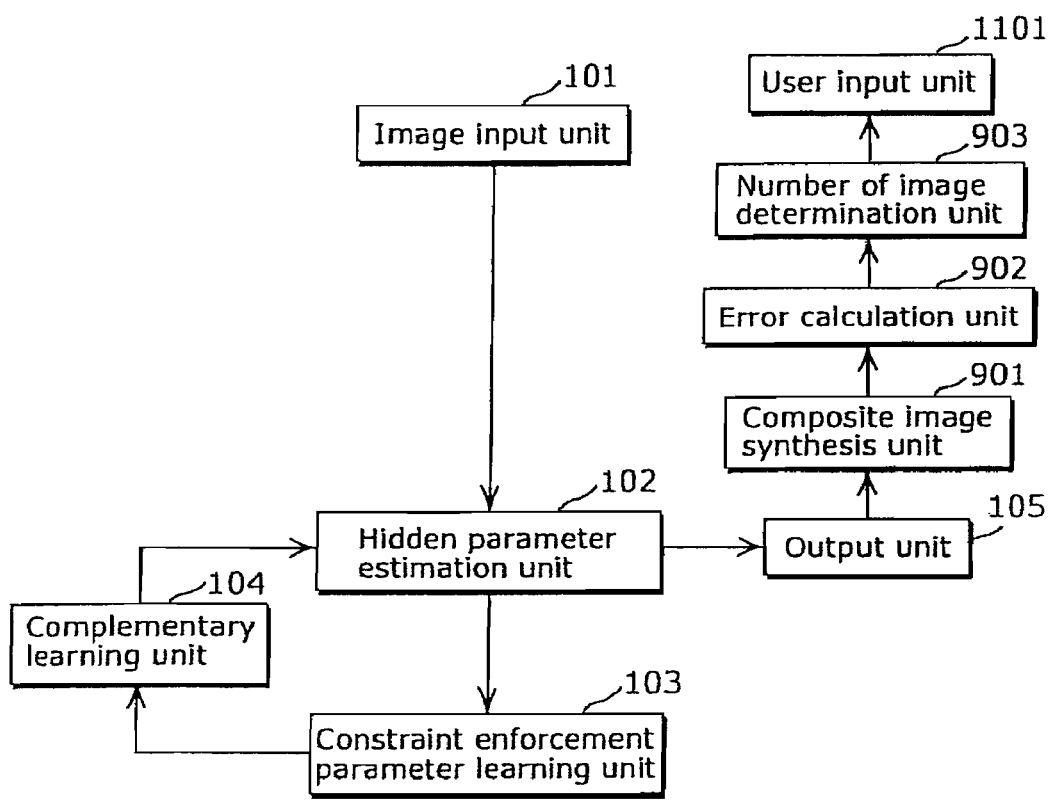
FIG. 11 is a diagram showing an example structure of an image processing device according to a third variation of the first embodiment of the present invention.

Meanwhile, as in the case of an image processing device according to the third variation of the first embodiment of the present invention shown in FIG. 11, a user input unit 1101 may be additionally provided, so that it is possible to inform the user of the fact that the number of input images is insufficient and to prompt the user to perform the processes again with an increased number of input images.

Figure 10:
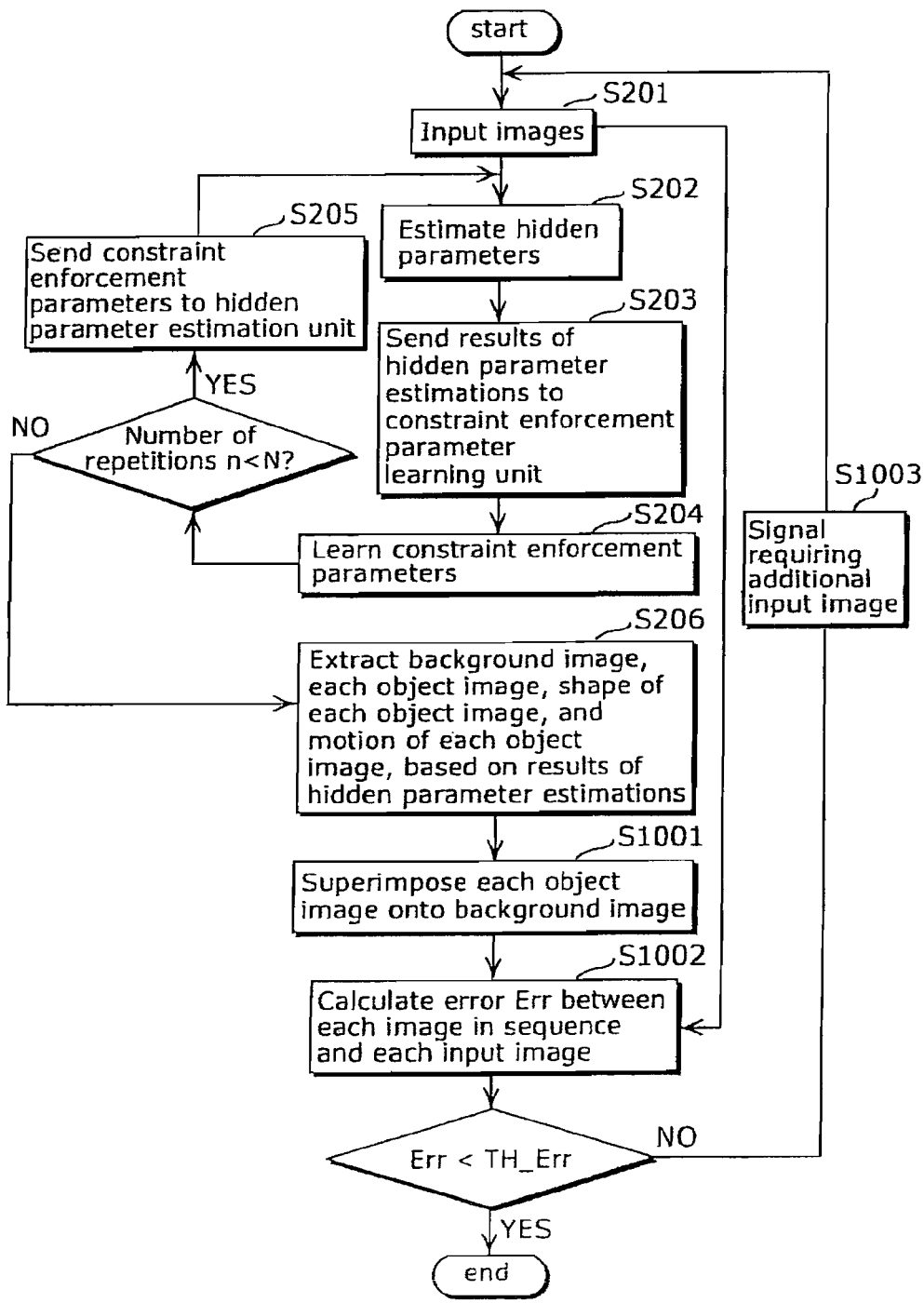
FIG. 10 is a flowchart showing operations performed by the image processing device according to the second variation of the first embodiment of the present invention.

FIG. 10 is a flowchart showing operations performed by the image processing device according to the second variation of the first embodiment of the present invention. Referring to this flowchart, the following describes an example of determining the number of input images in the image processing method of the present invention.

The processes from S201 to S206 are the same as those of the first embodiment, and thus their descriptions will not be repeated.

Figure 12:
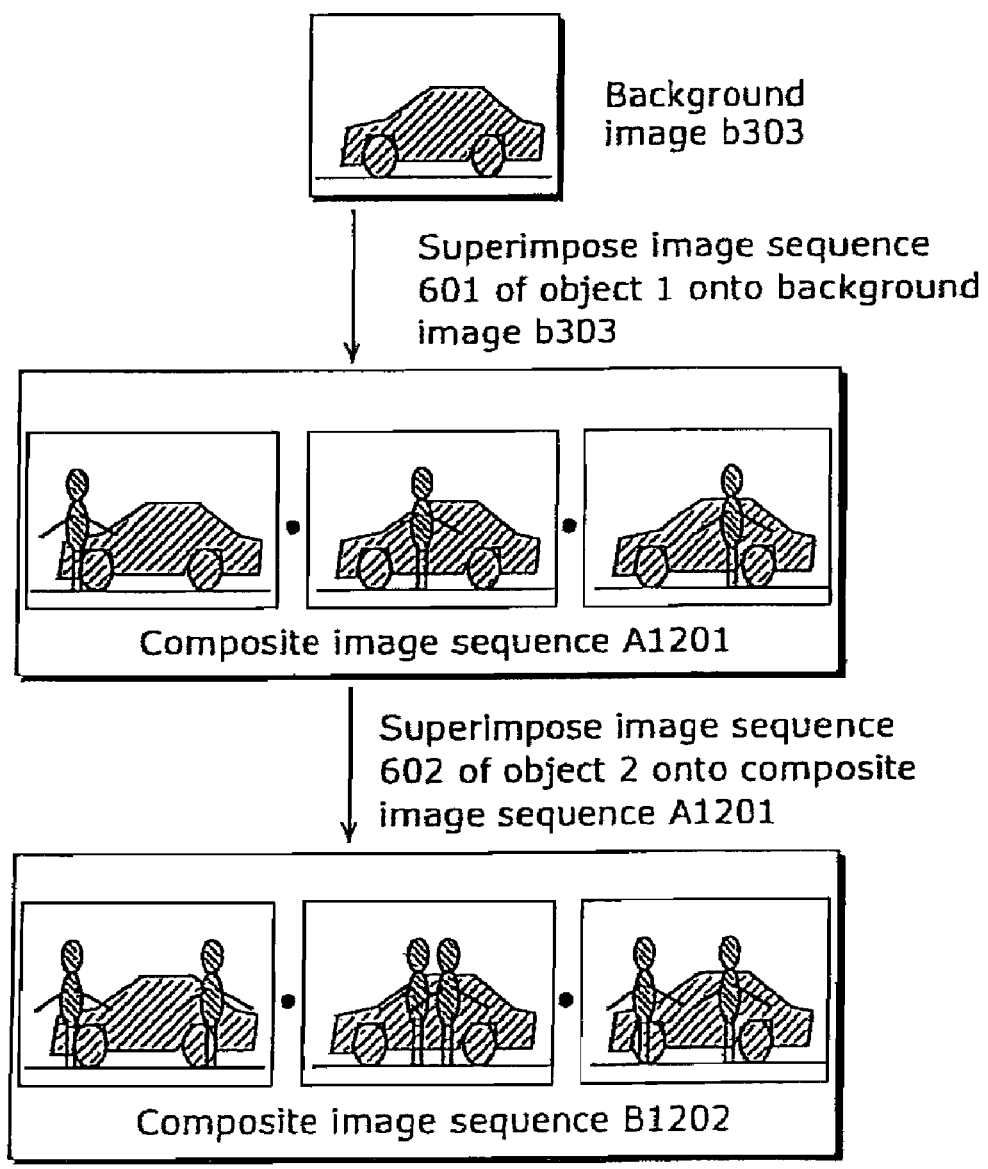
FIG. 12 is a diagram showing an example of synthesizing composite images according to the third variation of the first embodiment of the present invention.

Next, in S1001, the composite image synthesis unit 901 synthesizes composite images s' in the following manner based on the background b303, the image sequence 601 of the object 1, and the image sequence 602 of the object 2. As shown in FIG. 12, the composite image synthesis unit 901 synthesizes a composite image sequence A1201 by superimposing the image sequence 601 of the object 1 onto the background b303. The superimposition here refers to replacing the same pixels co-located in the background image and one image in the image sequence 601 of the object 1 by the corresponding pixel values of the image in the image sequence 601 of the object 1. Next, the composite image synthesis unit 901 synthesizes a composite image sequence B1202 by superimposing the image sequence 602 of the object 2 onto the composite image sequence A1201. The superimposition here refers to replacing the same pixels co-located in one image in the composite image sequence A1201 and one image in the image sequence 602 of the object 2 by the corresponding pixel values of the image in the image sequence 602 of the object 2. Note that the order in which superimposition is performed is determined by the definition of Equation 3. The above-description is applicable to the case where there is an increased number of objects and where camera motion is taken into account as shown in FIG. 4.

Next, in S1002, the error calculation unit 902 calculates an error between each image in the composite image sequence B1202 s' and each input image x' in the following manner:

$$Err = \frac{\sum_{t=1}^{T} \sum_{i=0}^{MN} (x_i^t - s_i^t)^2}{TMN}$$ Equation 45

In this equation, t denotes the number assigned to each input image and each composite image. It should be noted that it suffices if there is an appropriate correspondence between each input image and each composite image, and therefore they do not necessarily have to be placed in time series. M,N denotes the image size. The calculation of an error between each composite image and each input image may be done using another calculation method such as an S/N method.

Next, the number of image determination unit 903 compares the calculated error value Err with the predetermined value, and sends, in S1003, a signal for requiring the addition of input image(s) to the image input unit 101, when the error value Err exceeds the predetermined value. Then, the processes from S201 are performed again, using an increased number of input images. Alternatively, as shown in FIG. 11, the user input unit 1101 may display, to the user, information indicating that the number of input images is insufficient.

As thus above, it is possible to determine the number of input images from which hidden parameters can be appropriately extracted.

Second Embodiment

In the present embodiment, an intermediate time image synthesis method, which uses the image processing method described in the first embodiment, is described for generating an intermediate time image by synthesizing an object image in an intermediate time between input images using the object image, the shapes of the object images and the motion of the object, which are extracted as hidden parameters, and by superimposing the object image in the intermediate time onto a background image in the time period.

Figure 13:
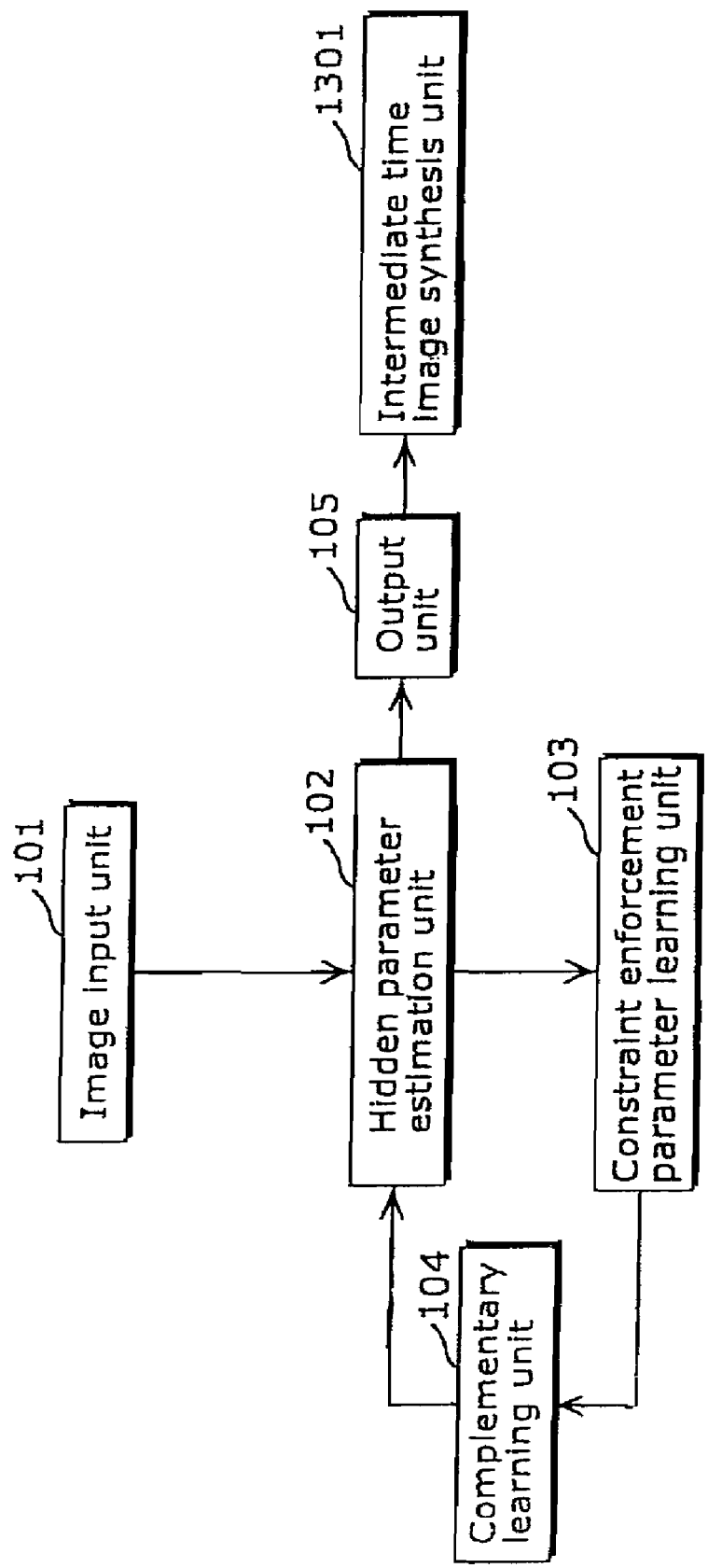
FIG. 13 is a diagram showing a structure of the image processing device in the second embodiment of the present invention.

FIG. 13 shows a structure of the image processing device in the second embodiment.

This image processing device is a device with a function for synthesizing an intermediate time image, in addition to the functions of the image processing device in the first embodiment, and includes the image input unit 101, the hidden parameter estimation unit 102, the constraint enforcement parameter learning unit 103, the complementary learning unit 104, the output unit 105 and an intermediate time image synthesis unit 1301. The image input unit 101 accepts plural images aligned in a time series. Note that the units from the hidden parameter estimation unit 102 to the complementary learning unit 104 are the same as the first embodiment and thus are not repeated.

The intermediate time image synthesis unit 1301 is a processing unit which receives the background image, the object images, the shapes of the object images and the motion of the object images, synthesizing an object image at the intermediate time of the input images using the received background image, the object images, the shapes of the object images and the motion of the object images and synthesizing an intermediate time image by superimposing the object image at the intermediate time over the background image at that time. In the present embodiment, the intermediate time image synthesis unit 1301 uses a background b303, an object image $f_1$304, an image $f_2$305 of the object 2, motion $T_1$306 of the object 1 and motion $T_2$307 of the object 2, which are extracted as hidden parameters in the hidden parameter estimation unit 102, and synthesizes an image that corresponds with the intermediate times of at least two input images by synthesizing an image of the object that corresponds with the intermediate time and superimposing it upon the background image. Note that when camera motion is taken into consideration, an intermediate time image based on the camera motion can be synthesized by treating the background b303 as shown in FIG. 4 as an object with motion.

Figure 15:
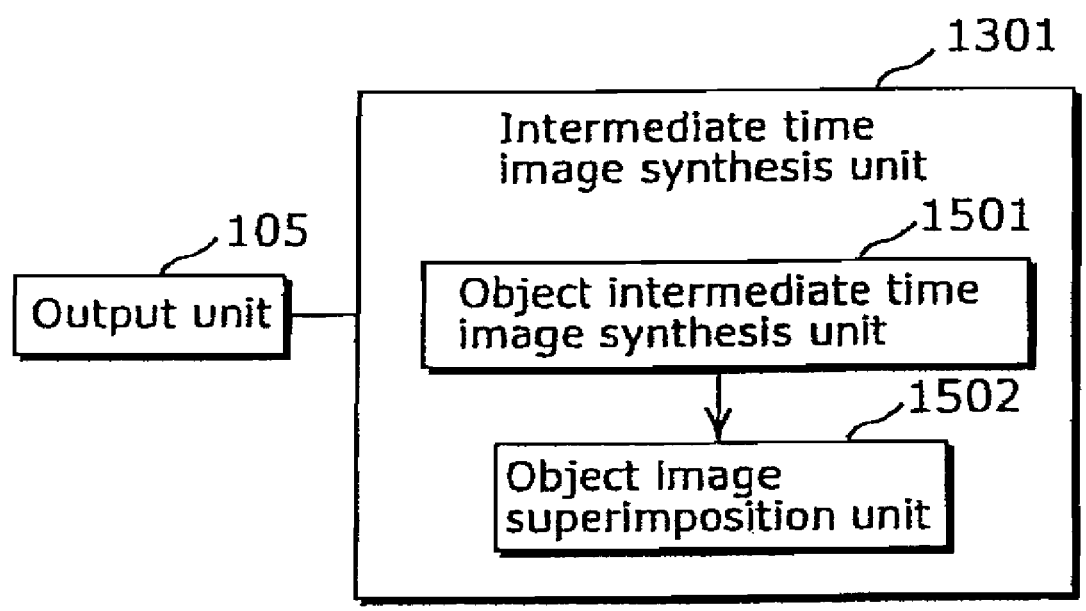
FIG. 15 is a diagram showing an intermediate time image synthesis unit in the second embodiment of the present invention.

The intermediate time image synthesis unit 1301 is configured with the object intermediate time image synthesis unit 1501 and the object image superimposition unit 1502, as shown in FIG. 15. The object intermediate time image synthesis unit 1501 is a processing unit which receives the background image, the object images, the shapes of the object images and the motion of the object images and synthesizes an object image at the intermediate time of the input images using the received background image, the object images, the shapes of the object images and the motion of the object images. The object image superimposition unit 1502 is a processing unit which synthesizes an intermediate time image by superimposing the object image at the intermediate time synthesized by the object intermediate time image synthesis unit 1501 onto the background image at the intermediate time.

Figure 14:
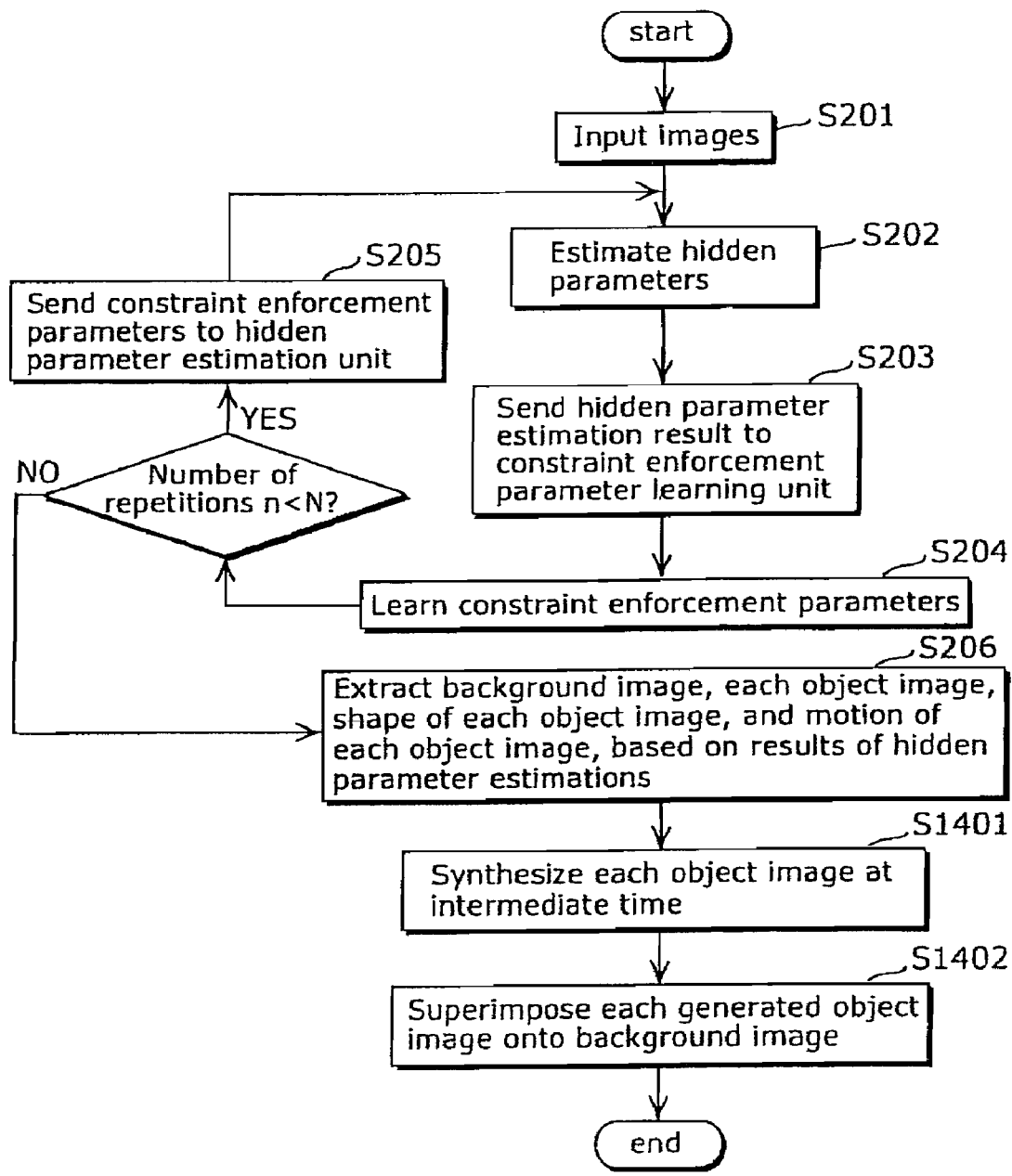
FIG. 14 is a flowchart showing operations performed by the image processing device in the second embodiment of the present invention.

Below, the image processing method for the present invention is explained in detail using the flowchart in FIG. 14.

First, plural input pictures in a time series are accepted at S201. Here, each image holds time-related information.

The processes from S202 to S206 are the same as in the first embodiment and thus their description is not repeated.

Figure 16:
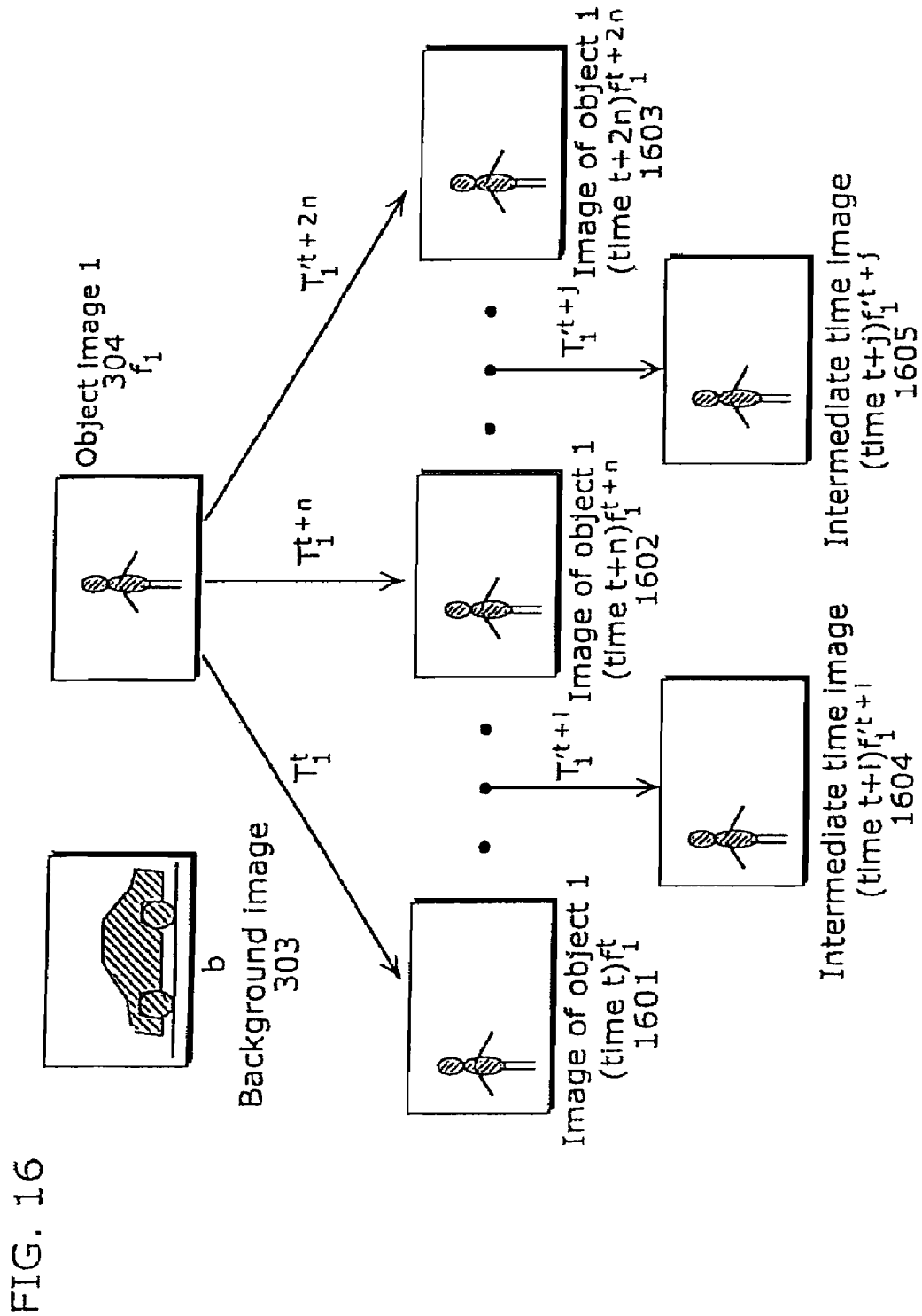
FIG. 16 is a diagram showing an example of intermediate time image synthesis in the second embodiment of the present invention.

Next, in S1401, the object intermediate time image synthesis unit 1501 synthesizes an object image at the intermediate time using the background b303, the image $f_1$304 of the object 1, the image $f_2$305 of the object 2, the motion $T_1$306 of the object 1 and the motion $T_2$307 of the object 2, which are obtained in S206 as shown in FIG. 15. Here, a method for synthesizing intermediate time images $f_1^{1+i}$ and $f_1^{1+j}$ at a time resolution multiplied by n is described, as shown in FIG. 16. Note that object images which correspond to input images that are temporally consecutive are expressed as $f_1^1, f_1^{1+n}$ and $f_1^{1+2n}$. First, the object image $f_1^1$ 1601 at the time t, the object image $f_1^{1+n}$ 1602 at the time t+n and the object image $f_1^{1+2n}$ 1603 at the time t+2n can be synthesized by moving each pixel in the image $f_1$304 of the object 1 using the motion $T_1$306 of the object 1 as shown in FIG. 6 in the first embodiment. Thus, the intermediate time image $f'^{1+i}_1$ 1604 of the object 1 can be synthesized with the same method used to synthesize the object image $f^1_1$ 1601 and so on, by estimating motion $T'^{1+i}_1$ for the intermediate time as in the following equation, and using the estimated motion $T'^{1+i}_1$ for the object 1 and using the image $f_1$ 304 of the object 1.

$$T'^{t+i}_1 = \frac{(n-i)T^t_1 + iT^{t+n}_1}{n} \quad 0 < i < n \qquad \text{Equation 46}$$

Note that the intermediate time image $f'^{1+j}_1$ 1605 is the same and thus the description is not repeated.

Further, $$A'_1 = \frac{T^{t+2n}_1 - 2T^{t+n}_1 + T^t_1}{2} \qquad \text{Equation 47}$$

$$B'_1 = \frac{-3T^t_1 + 4T^{t+n}_1 + T^{t+2n}_1}{2} \qquad \text{Equation 48}$$

$$T'^{t+i}_1 = t^2 A'_1 + tB'_1 + T^t_1 \quad 0 < i < n \qquad \text{Equation 49}$$

Thus, it is possible to estimate the motion $T'^{1+i}_1$ for the object 1 with acceleration taken into consideration. This is particularly effective when there are changes in the motion of the object. It is possible in this case as well to synthesize the intermediate time image $f'^{1+i}_1$ 1604 with a method similar to that of the object image $f^1_1$ 1601 using the estimated motion $T'^{i+i}_1$ of the object 1. Synthesizing an intermediate time image for the object 2 is also the same.

Next, in S1402, an intermediate time image is synthesized by superimposing the object image at the synthesized intermediate time onto the background image. First, an image at the same time as the input image can be synthesized by using the input image as is, or by performing a process similar to the synthesis process for the composite image in the composite image synthesis unit 901 of FIG. 9. Subsequently, the intermediate time images $f'^{1+i}_1$ 1604 and $f'^{1+j}_1$ 1605 of the image object 1 at the synthesized intermediate time are superimposed onto the background b303, in the same way as the composite image synthesis unit 901 for the intermediate time image $f'^{1+i}_1$ 1604 of the object 1.

The same sort of superimposition is performed for an image of the object 2 as that performed on the composite image synthesized using an image of the object 1. Note that the order for superimposition follows the definition in (Equation 3). Also, when the number of objects increases or the camera motion is included as in FIG. 4, the superimposition can be handled in the same way.

As above, an intermediate time image can be synthesized using the extracted background image, the object image, the shapes of the object images and the motion of the object. Thus, it is possible to synthesize an image with a time resolution higher than the input image sequence. By including the image processing method in AV equipment such as a video camera or a TV, an image with a higher time resolution can be synthesized as well, using a captured image or a recorded video.

Third Embodiment

In the present embodiment, a method for displaying the object image or the shapes of the object images, which are extracted as hidden parameters, in a monitor and the like, using the image processing method described in the First Embodiment, enables the user to select one of the displayed objects, erase the object image that the user has selected and synthesize an image wherein the erased object area is embedded within the background image.

Figure 17:
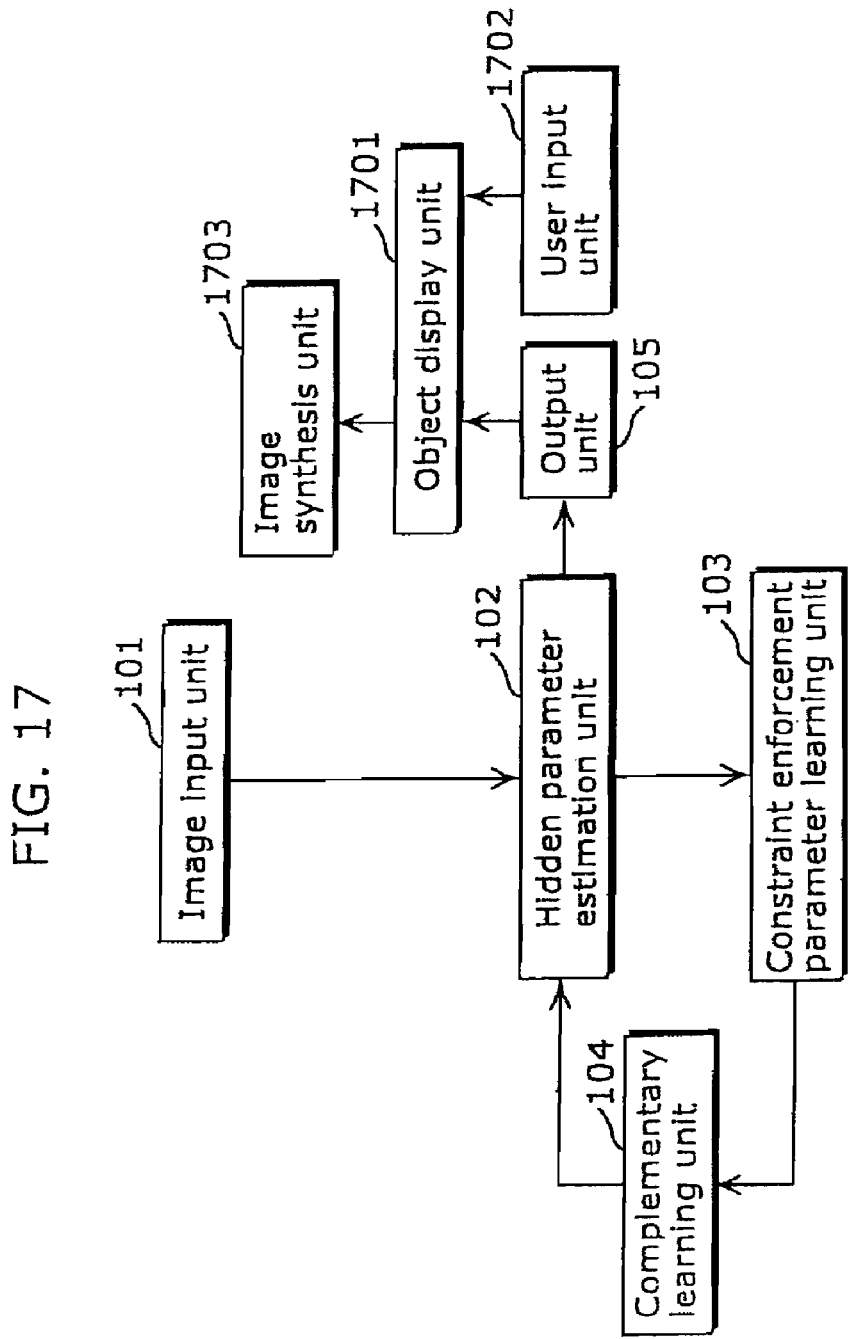
FIG. 17 is a diagram showing a structure of the image processing device in the third embodiment of the present invention.

FIG. 17 shows an outline of the processes performed in the third embodiment. This image processing device includes the image input unit 101, the hidden parameter estimation unit 102, the constraint enforcement parameter learning unit 103, the complementary learning unit 104, the output unit 105, an object display unit 1701, a user input unit 1702 and an image synthesis unit 1703. The units from the image input unit 101 to the complementary learning unit 104 are the same as the first embodiment and are thus not repeated.

The object display unit 1701 is a processing unit which displays the object image or the object image shape, which are extracted hidden parameters, in a monitor and the like, and in the present embodiment synthesizes at least one composite image using the background b303, the image $f_1$304 of the object 1 and the image $f_2$305 of the object 2, which are extracted as hidden parameters in the hidden parameter estimation unit 102, and displays the image $f_1$304 of the object 1 and the image $f_2$305 of the object 2 in such a way as to be discernible from each other.

The user input unit 1702 is a processing unit that acquires at least one selection from the user from among the objects displayed by the object display unit 1701, and in the present embodiment, the user selects an unnecessary object image from the object images displayed by the object display unit 1701.

The image synthesis unit 1703 is a processing unit that deletes the object selected by the user by superimposing an object image which does not correspond to the object image or the shapes of the object images that the user has selected, and synthesizes an image in which the deleted object area is embedded in the background image; in the present embodiment, the object that the user has selected is erased by superimposing an object image that the user did not select on the background image and an image in which the erased object area is embedded in the background image is synthesized.

Figure 18:
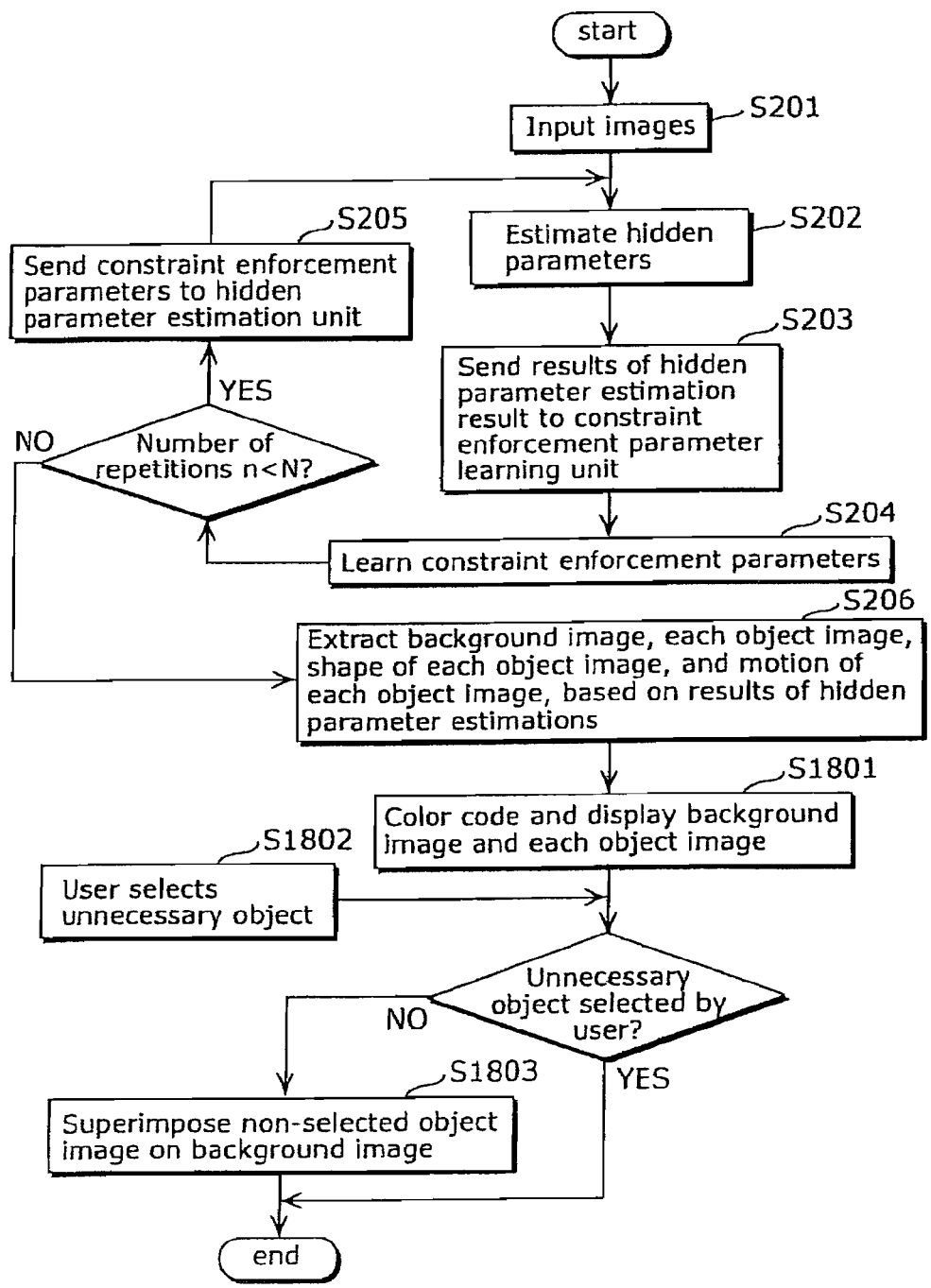
FIG. 18 is a diagram showing operations performed by the image processing device in the third embodiment of the present invention.

Below, the image processing method in the present invention is explained in detail using the flowchart in FIG. 18. The processes from S201 to S206 are the same as the first embodiment and thus their description is not repeated.

Next, at S1801, at least one composite image is synthesized using the background b303, the image $f_1$304 of the object 1 and the image $f_2$305 of the object 2, which are extracted as hidden parameters by the hidden parameter estimation unit 102. More specifically, the image $f_1$304 for the object 1 is superimposed on the background b303. Here, superimposition means to replace pixel values at the same position in the image with a pixel value of the image $f_1$304 of the object 1. Next, the image $f_2$305 of the object 2 is superimposed on the superimposed image. Here, the image $f_1$304 of the object 1 and the image $f_2$305 of the object 2 should be composed such that they overlap as little as possible. Subsequently, the user color codes the image 1903 for the object 1 and the image 1904 for the object 2 as shown in the display image A1901 and the display image B1902 in FIG. 19 such that they are easily distinguished, and displays them in a monitor or the like.

Next, in S1802, the user selects an unnecessary object image from the composite image displayed in the monitor or the like. Here, a specific object image alone may be selected using AV equipment such as a video camera, a TV and so on, or by turning a dial or the like on a remote controller and the like, by making selection possible via clicking with a mouse, or by direct selection via a touch panel equipped with a monitor or a video camera. The number of unnecessary objects is not limited. For example, by selecting all of the object images as unnecessary objects, the background image by itself may be obtained.

Figure 19:
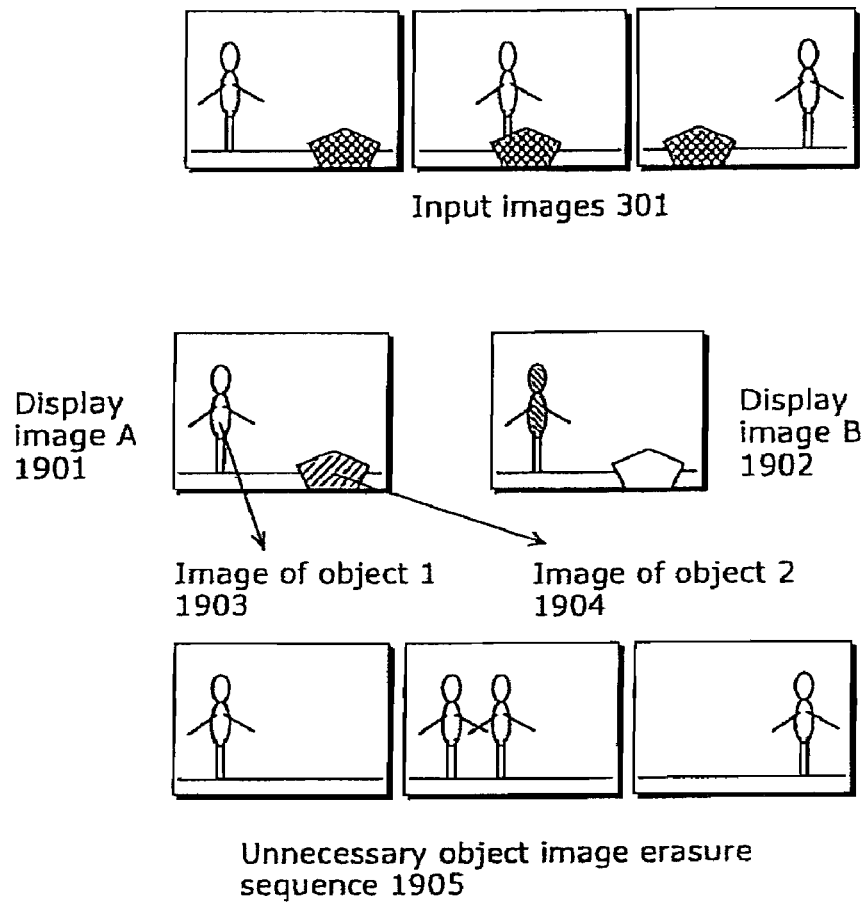
FIG. 19 is a diagram showing an example of unnecessary object erasure in the third embodiment of the present invention.

Next, in S1803, the image synthesis unit 1703 erases the object selected by the user and synthesizes an image wherein the erased object area is embedded within the background image. In FIG. 19, an unnecessary object erasure sequence 1905 is shown, which is synthesized when the user selects the image 1904 for the object 2 as an unnecessary object. More specifically, an object image sequence using the object images that the user does not select is synthesized and this object image sequence is superimposed sequentially on the background b303. The sequence of image synthesis is the same as that of the composite image synthesis unit 901 and thus the description is not repeated. Note that the superimposing sequence follows the definition in (Equation 3), however, processing is not performed for object images that the user does not select. Also, when the number of objects increases or the camera motion is included as in FIG. 4, the overlapping can be handled in the same way.

Here, the background image and the respective object images, which are extracted as hidden parameters, are images that have eliminated the effects of occlusions, in which pixel information in a part of the background or the object is missing due to an object covering an object. Thus, even when the erased object image hides part of the background or part of another object, an image sequence which has eliminated the effect of this hiding can be synthesized.

Thus, not only is the unnecessary object selected by the user from at least one image erased with one touch, an image sequence can be synthesized in which the erased area is embedded in the background image. Thus, when an unnecessary object is photographed with video photography and the like, a video in which the object has been erased can be reproduced afterwards.

Fourth Embodiment

In the present embodiment, a method is described which can extract a background image and object images with comparatively little noise and synthesizes an intermediate time image when the pixel values for the extracted background image and each object image are inconstant and confidence is low in the first through third embodiments, by interpolating the pixel values for the background image and each object image using a pixel value in an adjacent area. Here, the synthesis of an intermediate time image is described as an example but the present invention may be applied to any of the examples from the first through the third embodiments.

Figure 20:
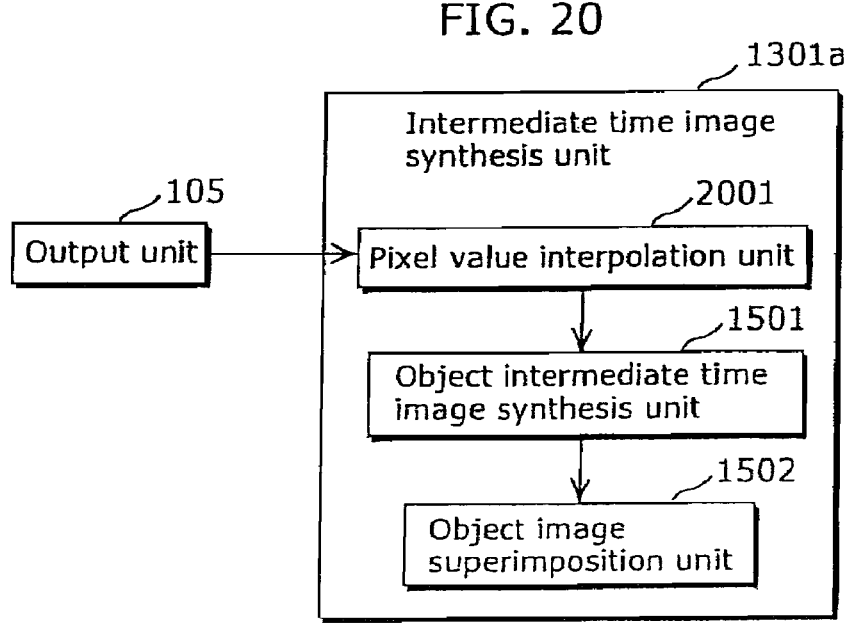
FIG. 20 is a diagram showing a structure of the image processing device in the fourth embodiment of the present invention.

FIG. 20 shows a structure of the image processing device in the fourth embodiment. This image processing device is a device that includes a function of synthesizing the intermediate time image using pixel interpolation, in addition to the functions of the image processing device in the first embodiment, and includes the image input unit 101, the hidden parameter estimation unit 102, the constraint enforcement parameter learning unit 103, the complementary learning unit 104, the output unit 105, and the intermediate time image synthesis unit 1301a. The intermediate time image synthesis unit 1301 is composed of a pixel value interpolation unit 2001, an object intermediate time image synthesis unit 1501 and an object image superimposition unit 1502. The pixel value interpolation unit 2001 is a processing unit which receives the background image and each object image, which are hidden parameters outputted from the output unit 105, and when the reliability of the pixel value for the received background image and each object image is low, interpolates the pixel value using an adjacent area pixel value; in the present embodiment, the pixel value interpolation unit 2001 interpolates the pixel value with a low reliability using an adjacent pixel value based on the precision of Gaussian distribution parameters for the background image and the object images extracted in the hidden parameter estimation unit 102. Note that in the object intermediate time image synthesis unit 1501 and the object image superimposition unit 1502, an intermediate time image is synthesized using a pixel value interpolated by the pixel value interpolation unit instead of the pixel value of the image extracted by the hidden parameter estimation unit 102.

Figure 21:
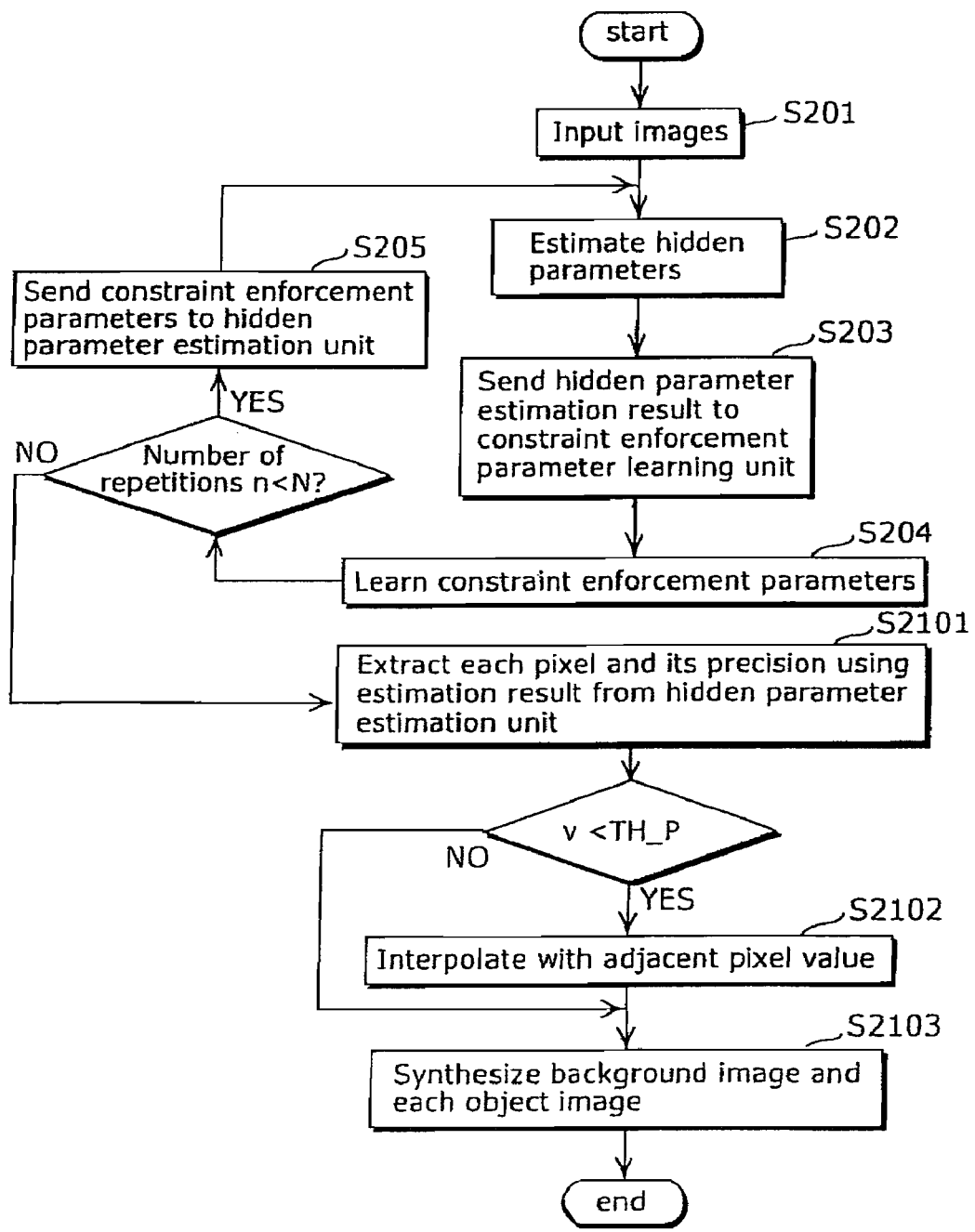
FIG. 21 is a flowchart showing operations performed by the image processing device in the fourth embodiment of the present invention.

Below, the image processing method in the present invention is explained in detail using the flowchart in FIG. 21. The processes from S201 to S205 are the same as the first embodiment and thus their description is not repeated.

Next, in S2101, the pixel value interpolation unit 2001 determines the reliability of the pixel value using Gaussian distributions parameters $(u_{f2},v_{f2}),(u_{f1},v_{f1}),(u_b,v_b)$ for the background b303, the image $f_1$ 304 of object 1 and the image $f_2$ 305 of the object 2, which are obtained by calculating the equations from (equation 12) to (equation 17) in the hidden parameter estimation unit 102 at S206. Specifically, $v_{f2},v_{f1},v_b$ is used as a determination basis for the reliability of the pixel value. Note that $v_{f2},v_{f1},v_b$ is a precision that is a reciprocal distribution and is obtained for every pixel. Subsequently, the reliability of each pixel is assessed according to the relationship between $v_{f2},v_{f1},v_b$ and a pre-set threshold value TH_P.

Next, in S2102, a pixel with a smaller precision than the threshold value TH_P is interpolated using an adjacent pixel value and the precision.

$$u_{f2\_new} = \frac{\sum_j v_{f2\_j} u_{f2\_j}}{\sum_j v_{f2\_j}} \qquad \text{Equation 50}$$

Here, j stands for 4 or 8 pixels adjacent the pixel to be interpolated. $u_{f1\_new}$ and $u_{b\_new}$ can be calculated in the same way and so their explanation is not repeated.

Also, the interpolation method for the pixel value is not limited to (Equation 50) and may be any method which uses information related to the reliability of the pixel value.

Subsequently, in S2103, a composite image is synthesized using images that are respectively interpolated instead of the background b303, the image $f_1$ 304 of object 1 and the image $f_2$ 305 of the object 2. Synthesizing the composite image is the same in S1001 in the first embodiment, S1402 in the second embodiment, S1801 in the third embodiment and so on, thus the description is not repeated.

As above, when the reliability of the pixel value in each pixel that is extracted as a hidden parameter is low, a background image and each object image with less noise can be extracted by interpolating the pixel value according to the reliability of a pixel value in an adjacent area. Thus, it is also possible to synthesize an intermediate time image with less noise.

Fifth Embodiment

In the present embodiment, a method is described for defining the parameters in a point spread function, which expresses the blurriness of the image as one of the hidden parameters in the first through fourth embodiment, and for extracting a background image and each object image with the quality of the reconstructed input image.

The image processing device in the present embodiment is a device which has a function of extracting a background image and object images which have a revised image quality compared to the input images using a point spread function, in addition to the functions of the image processing device in the first through fourth embodiments, and includes a hidden parameter estimation unit 102a in addition to the hidden parameter estimation unit 102 which is included in the first through fourth embodiments.

The hidden parameter estimation unit 102a is described below since only the hidden parameter estimation unit 102a differs from the first through the fourth embodiments.

The hidden parameter estimation unit 102a has a function of holding a point spread function parameter which expresses the deterioration process of an image as a hidden parameter in addition to the functions of the hidden parameter estimation unit 102 in the first through fourth embodiments, and synthesizing a background image and object images that have enhanced quality greater than the input images by estimating the inverse function of the function.

Figure 22:
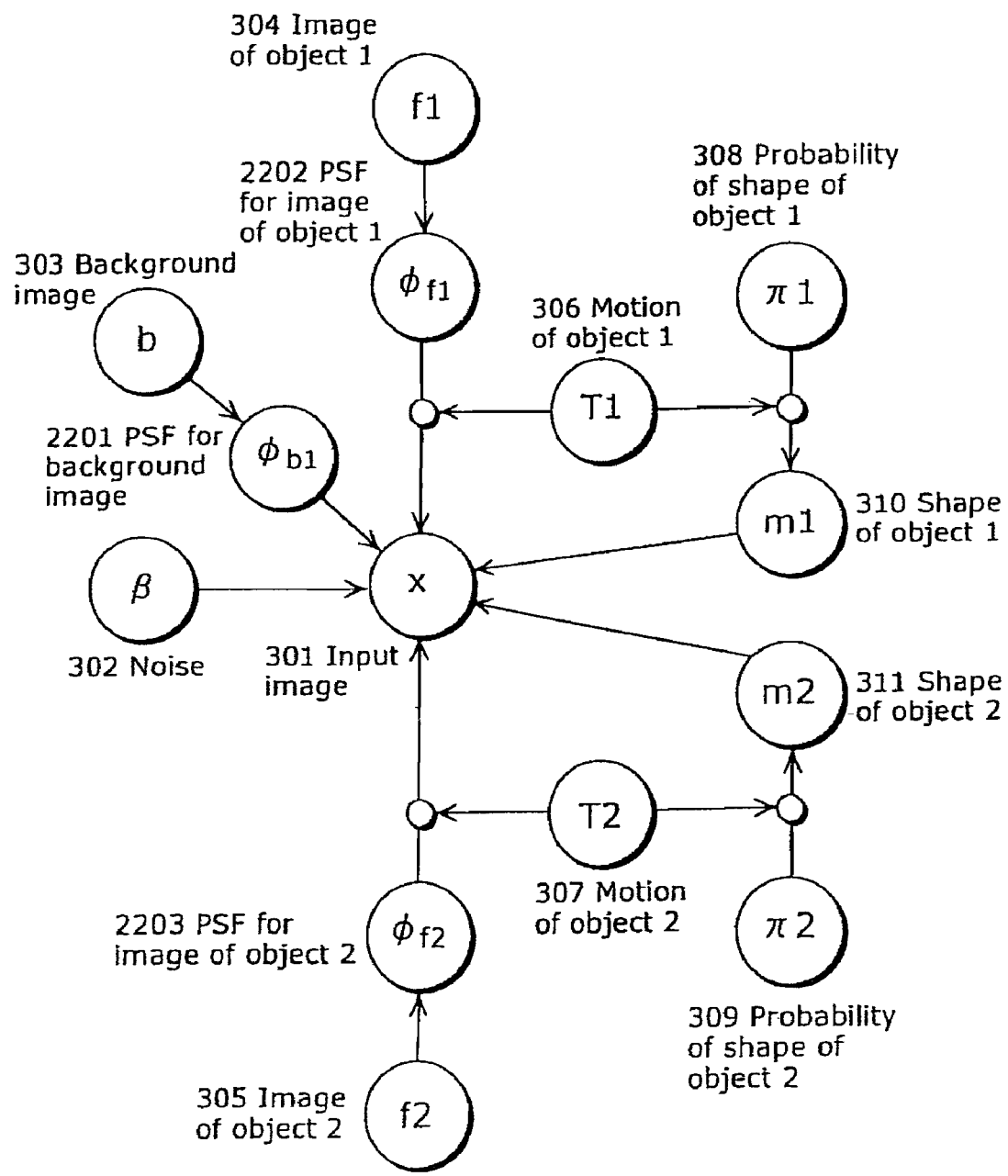
FIG. 22 is a diagram showing example processes of the hidden parameter estimation unit in the fifth embodiment of the present invention.

The configuration in FIG. 22 is used in place of FIG. 3. Here, it is assumed that, in addition to the hidden parameters shown in FIG. 3, the present invention is configured with a point spread function $\phi_b$ 2201 for the background b303, a point spread function $\phi_{f1}$ 2202 for the image $f_1$ 304 of the object 1, and a point spread function $\phi_{f2}$ 2203 for the image $f_2$ 305 of the object 2.

Here, the point spread function for the background b303 is defined with a two dimensional Gaussian distribution as in the following equation.

$$\phi_b(x_b, y_b) = \frac{1}{2\pi \Sigma_b} \exp\left\{-(x_b - s_{x\_b}) \sum_b^{-1} (y_b - s_{y\_b})\right\} \quad \text{Equation 51}$$

Here, $(x_b, y_b)$ are each pixel positions in a background image and $(s_{x\_b}, s_{y\_b})$ are average pixels in a Gaussian distribution. The following equation expresses the deterioration of an image based on a point spread function.

$$b_{new}(x_b, y_b) = b(x_b, y_b) * \phi_b(x_b, y_b) \quad \text{Equation 52}$$

Here, $b(x_b, y_b)$ indicates a deteriorated image, $b_{new}(x_b, y_b)$ indicates a high-quality image before deterioration and $\phi_b(x_b, y_b)$ indicates a point spread function for making $b_{new}(x_b, y_b)$ deteriorate. Further, as follows, by considering $b_{new}(x_b, y_b)$ to be an enhanced quality image for estimation and $b(x_b, y_b)$ to be the same image as the image obtained from the first through the fourth embodiments, the image deterioration equation in Equation 52 can be applied to image quality enhancement. In other words, by finding the inverse function of the point spread function $\phi_b(x_b, y_b)$, and with $b(x_b, y_b)$ as an input image, a quality enhanced image $b_{new}(x_b, y_b)$ can be obtained. The right side of the convolution calculation in (FIG. 52) is simply multiplication in a frequency domain, as shown in FIG. 53, thus:

$$B(f_x, f_y) = B_{new}(f_x, f_y) \Phi_b(f_x, f_y) \quad \text{Equation 53}$$

Here, B, Bnew and Φb are each Fourier transform outputs of b, bnew and Φb. Therefore Bnew is found by:

$$B_{new}(f_x, f_y) = B(f_x, f_y) / \Phi_b(f_x, f_y) \quad \text{Equation 54}$$

and by applying an inverse Fourier transform to this equation, $b_{new}(x_b, y_b)$ can be obtained.

In the hidden parameter estimation unit 102a, the background b303 can obtain an image with blur corrected as the background $b_{new}$. A point spread function for the image $f_1$ 304 of the object 1 and a point spread function for the image $f_2$ 305 of the object 2 can be defined in the same way.

Below, a method for finding a point spread function for a quality enhanced image $b_{new}(x_b, y_b)$ as a hidden parameter in the hidden parameter estimation unit 102 is described.

(Equation 1) and (Equation 2) can be rewritten using the point spread functions $\phi_b, \phi_{f1}, \phi_{f2}$ in the following manner.

$$P(x, f, b, \beta, \pi, T, m) = P(x | f, b, \beta, T, m, \phi) P(m | \pi, T) P(f) P(b) P \\ (\beta) P(T) P(\pi) P(\phi) \quad \text{Equation 55}$$

$$P(x_k | b, f, m, T, \beta, \phi) = N(x_k | (T_2 \phi_{f2} f_2)_k, \beta_{f2}^{-1})^{\delta(m=2)} N(x_k | \\ (T_1 \phi_{f1} f_1)_k, \beta_{f1}^{-1})^{\delta(m=1)} N(x_k | \phi_b b_k, \beta_k^{-1})^{\delta(m=0)} \quad \text{Equation 56}$$

From this relationship, update equations for the quality-enhanced background image $b_{new}$ 2204, the quality-enhanced image $f_{1new}$ 2205 of the object 1 and the quality-enhanced image $f_{2new}$ 2206 of the object 2 can be re-written using the inverse point spread function $\phi_b$ in (Equation 12) and (Equation 13). Note that the quality-enhanced background $b_{new}$ 2204, the quality-enhanced image $f_{1new}$ 2205 of the object 1 and the quality-enhanced image $f_{2new}$ 2206 of the object 2 are assumed to have Gaussian distributions and an example is described in which each Gaussian distribution parameter to be sought is $(u_{new\_b}, v_{new\_b}), (u_{new\_f2}, v_{new\_f2}), (u_{new\_f1}, v_{new\_f1})$.

$$u'_{new\_b} v'_{new\_b} = u_{new\_b} v_{new\_b} + <\beta_b \phi_b^{-1} * (1 - m_1 - m_2) \\ x> \quad \text{Equation 57}$$

$$v'_{new\_b} = v_{new\_b} - <\beta_b \phi_b^{-1} * (1 - m_1 - m_2)> \quad \text{Equation 58}$$

These equations can be expressed using an inverse function of the point spread function $\phi_b$ for (Equation 14) through (Equation 17) in the same way as the Gaussian distribution parameter $(u_{new\_f1}, v_{new\_f1})$ for an enhanced-quality image $f_{1new}$ 2205 of the object 1 and the Gaussian distribution parameter $(u_{new\_f1}, v_{new\_f1})$ for an enhanced-quality image $f_{2new}$ 2206 of the object 2 are used.

Next, a set of parameters for each image of the point spread function parameter $\phi_b$ 2201 for the background b303, the point spread function parameter $\phi_{f2}$ 2202 for the image $f_1$ 304 of the object 1, and the point spread function parameter $\phi_{f2}$ 2203 for the image $f_2$ 305 of the object 2 can be obtained, in the same way as the noise β302. In other words, a hidden parameter that describes the number of images can be obtained. Thus, since (Equation 51) can be expressed with a Gaussian distribution parameter, it is possible to estimate a hidden parameter as below, with an update equation that estimates a Gaussian distribution parameter in the same way as (Equation 12) through (Equation 17).

$$s'_{x\_b} \sigma'_{x\_b} = s_{x\_b} \sigma_{x\_b} + <\beta_b \phi_b^{-1} * (1 - m_1 - m_2) x> \quad \text{Equation 59}$$

$$\sigma'_{x\_b} = \sigma_{x\_b} - <\beta_b \phi_b^{-1} * (1 - m_1 - m_2)> \quad \text{Equation 60}$$

Here, $\sigma_{x\_b}$ is an x directional element of $\Sigma_b$ in (Equation 51). Also, y directional elements are calculated in the same way as (Equation 59) and (Equation 60).

Of course, the point spread function parameter $\phi_{f1}$ 2202 for the image $f_1$ 304 of the object 1 and the point spread function parameter $\phi_{f2}$ 2203 for the image $f_1$ 304 of the object 1 can be found in the same way.

Subsequently, by defining the function as in (Equation 52), and by defining the background b303 as the background $b_{new}$, the hidden parameter estimation unit 102 can obtain an image in which the effects of blurring are repaired, especially related to optical blur. The point spread function for the image $f_1$ 304 of the object 1, and the point spread function for the image f₂305 of the object 2 may be defined in the same way.

Note that the image processing device is described for the case where the point spread function is described in a Gaussian distribution as in (FIG. 51), but a discrete distribution may be assumed as in the motion T₁ and T₂ in the first embodiment.

Using the processes above, not only is it possible to estimate a background image, at least two object images, the shape of each object image and the motion of each object image from plural images while avoiding a local minimum, it is also possible to extract a background image and each object image with higher image quality than the input image while estimating the point spread function parameter for the background image and each object image.

Further, by combining these processes with the method described in the second embodiment, the time resolution can be increased more than the input image sequence and the quality of the image can be enhanced. By packaging the image processing method in AV equipment such as a video camera or a TV, an image with a higher time resolution and enhanced image quality can be synthesized from a captured image or a recorded moving image.

Sixth Embodiment

In the present embodiment, an example is described in which the learning of the constraint enforcement parameter learning unit 103 in the first embodiment as described in S204 is performed using a different method from the first embodiment.

The image processing device in the present embodiment includes a constraint enforcement parameter learning unit 103a instead of the constraint enforcement parameter learning unit 103 included in the image processing device in the first embodiment.

The constraint enforcement parameter learning unit 103a is a processing unit which selects a pixel adjacent the pixel to become a pair, determines whether each pixel belongs to the background image or each object image area, and applies respective, differing constraints to the hidden parameter when the respective pixels belong to different objects and when the respective pixels belong to the same object. Below, the operations of the constraint enforcement parameter learning unit are explained using FIG. 23.

Figure 23:
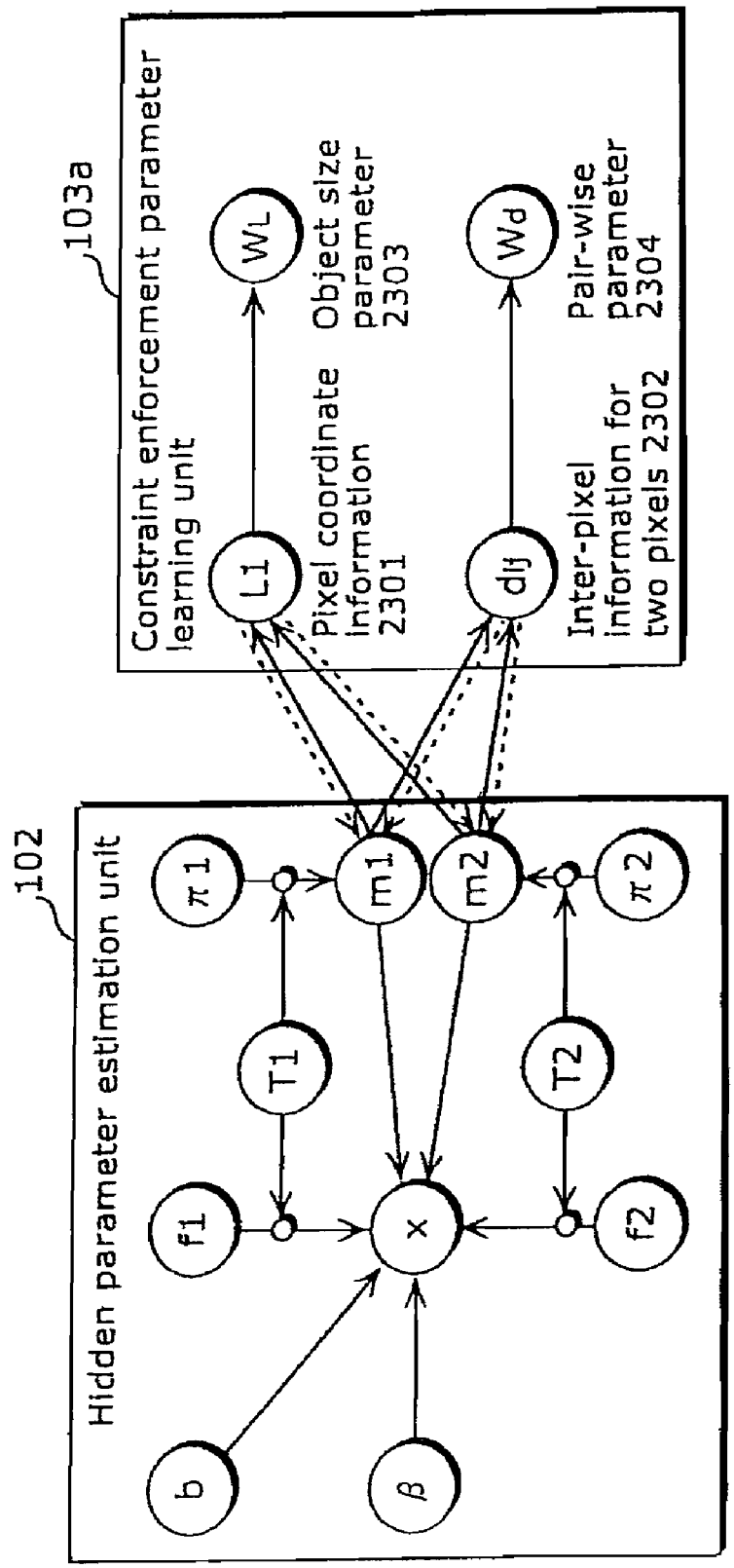
FIG. 23 is a diagram showing example processes of a complementary learning unit in the sixth embodiment of the present invention.

In S203, the hidden parameter estimation unit 102 transmits the hidden parameter estimation result estimated in S202, as shown in FIG. 23, to the constraint enforcement parameter learning unit 103a. Here, an example is described in which a shape m₁310 of the object 1 and a shape m₂311 of the object 2, which are hidden parameters, are used for the learning of the constraint enforcement parameter. However, the learning for the constraint enforcement parameter is not limited to a shape of an object and may be a hidden parameter as written above.

Next, at S204, the estimation result for the hidden parameter, which is transmitted in S203, is made into a training signal and the constraint enforcement parameter is learned. Below, an example is described in which constraint enforcement parameters related to the shape m₁310 of the object 1 and the shape m₂311 of the object 2 are learned, with the hidden parameter estimation result for the shape m₁310 and the shape m₂311 of the object 2 made into a training signal Q(m_t) 501. The constraint enforcement parameter learning unit 103 is described using FIG. 23. The constraint enforcement parameter learning unit is configured with the pixel position information L2301, the inter-pixel information for two pixels d_{ij} 2302, an object size parameter w_L 2303 and a pay-wise parameter w_d 2304. Here, the pixel position information L2301 holds position information for the pixels obtained from the input image. Subsequently, the inter-pixel information for two pixels d_{ij} 2302 holds information related to luminance information between two pixels in the input image. Also, in the object size parameter w_L 2303, constraint enforcement parameters that express the size of the object based on the pixel position information L2301 are learned. A pair-wise parameter w_{ij} 2304 assesses whether the respective pixels in the two pixel information d_{ij} 2302 belong to the background image area or one of the object image areas. Different constraint enforcement parameters are learned when the respective pixels belong to different objects and when the respective pixels belong to the same object.

Here, the constraint enforcement parameter learning unit 103a learns the constraint enforcement parameter by learning the object size parameter w_L 2303 and the pair-wise parameter w_d 2304. As mentioned in the first embodiment, pixel motion information can of course also be used.

Here, a constraint enforcement parameter using the relationship between the pixel position information L2301 and the object size parameter w_L 2303 is expressed as in the following equation.

$$p_c(m=1|L)=\exp\{-w_{L1}(L-w_{L2})^2\} \quad \text{Equation 61}$$

$$p_c(m=2|L)=\exp\{-w_{L3}(L-w)^2\} \quad \text{Equation 62}$$

Here, L is the position of each pixel. Finding the object size parameter (w_{L1}, \ldots w_{L4}) 2303 means learning the constraint enforcement parameter.

Next, the relationship between the inter-pixel information for two pixels d_{ij} 2302 and the pair-wise parameter w_d 2304 is expressed as in the following equation.

$$p_c(m_i,m_j|d_{ij})=\exp\{-w_{j1}d_{ij}^2\}^{\delta(m1=mj)}\{1\}^{\delta(mi=mj)} \quad \text{Equation 63}$$

In other words, in finding the pair-wise parameter 2304, the constraint enforcement parameter is also learned.

As above, the constraint enforcement parameters expressed as in the equations from (Equation 61) to (Equation 63) can be thought of as a Gaussian distribution with an average value and precision as parameters. In other words, the constraint enforcement parameters can be learned via the update equations for Gaussian distribution, (Equation 12) through (Equation 17), as well as similar update equations.

Next, at S205, the constraint enforcement parameter p_c(m_i|x) 502 is transmitted to the hidden parameter estimation unit 102 as shown in FIG. 23. Subsequently, processing is performed as in S202. At this point, the constraint enforcement parameter p_c(m_i|x) functions as a constraint for finding the shape m₁310 of the object 1 and the shape m₂311 of the object 2. More specifically, processing is performed by adding the constraint enforcement parameter p_c(m_i|x) to the update equation in the hidden parameter estimation unit in the same way as (Equation 43).

Thus, the hidden parameter estimation unit 102 can estimate a hidden parameter while avoiding a local minimum. Here, learning the constraint enforcement parameter is described for the shape m₁310 of the object 1 and the shape m₂311 of the object 2, however it is also possible to add the constraint perimeter in the same way to another hidden parameter as in (Equation 43) and (Equation 44). Further, in the hidden parameter estimation unit 102, even when a constraint enforcement parameter is added to only the shape m₁310 of the object 1 and the shape m₂311 of the object 2, the efficacy for avoiding a local minimum can be applied to the other hidden parameters in order to optimize all hidden parameters simultaneously. Thus, a hidden parameter which has avoided a local minimum can be estimated without directly adding constraint enforcement parameters to the background b303, the image $f_1$304 of the object 1, the image $f_2$305 of the object 2, the motion $T_1$306 of the object 1 and the motion $T_2$307 of the object 2, which are hidden parameters to be found.

Next, after repeating S202 through S205 by a set amount of times N, the result estimated by the hidden parameter estimation unit is outputted as an image at S206. Below is the same as the first embodiment and thus the description is not repeated.

According to the above, it is possible to simultaneously estimate a background image, at least two object images, the shape of each object image and the motion of each object image from among plural images, while avoiding a local minimum.

Above, the image processing method and the image processing device according to the present invention is described based on examples in the embodiments and the modifications, however the present invention is not limited to these embodiments and modifications. Those skilled in the art will readily appreciate that many modifications are possible in the exemplary embodiments without materially departing from the novel teachings and advantages of this invention.

Also, configurations in which the constituent elements in each of the embodiments are combined at discretion are included in the present invention. For example, by combining the second and third embodiments, an image processing device with an editing function for erasing the object image selected by the user in the intermediate time image synthesized by the intermediate time image synthesis unit 1301 is realized; this kind of image processing device is also included in the present invention.

INDUSTRIAL APPLICABILITY

The present invention can be used as an image processing device that simultaneously extracts a background image and an object image from among plural images, and in particular can be used as an image processing device for simultaneously extracting a background image, at least two object images, the shape of each object image and the motion of each object image from among plural images, while avoiding a local minimum. The present invention can also be used as an image processing device and so on packaged inside AV equipment such as a motion analysis device, a surveillance device, a video camera or a TV.

The invention claimed is:

1. An image processing method of simultaneously extracting a background image, at least two object images, a shape of each object image and motion of each object image, which are defined as hidden parameters, from among plural images, said image processing method comprising:

an image input step of accepting input of plural images arranged in time series;

a hidden parameter estimation step of estimating a hidden parameter based on the plural images and a constraint enforcement parameter, wherein the constraint enforcement parameter indicates a condition of at least one of the hidden parameters, using an iterative learning method;

a constraint enforcement parameter learning step of learning a constraint enforcement parameter related to the hidden parameter using an estimation result from said hidden parameter estimation step as a training signal;

a complementary learning step of causing the estimation of the hidden parameter and the learning of the constraint enforcement parameter to be iterated, the estimation of the hidden parameters being performed in said hidden parameter estimation step, which uses a learning result given in said constraint enforcement parameter learning step, and the learning of the constraint enforcement parameter being performed in said constraint enforcement parameter learning step, which uses the estimation result of the hidden parameter given in said hidden parameter estimation step;

an output step of outputting the hidden parameter estimated in said hidden parameter estimation step after the iterative learning is performed in said complementary learning step; and an intermediate time image synthesis step of:

receiving the background image, the object images, the shapes of the object images, and the motion of the object images, which are hidden parameters outputted in said output step, synthesizing, for each of at least two objects, an object image within an intermediate time between input images using the background image, the object images, the shapes of the object images and the motion of the object images, and synthesizing, for the object image synthesized for each of the at least two objects, an intermediate time image by superimposing the object image at the intermediate time onto the background image at the corresponding time.

2. The image processing method according to claim 1, wherein the constraint enforcement parameter is a parameter related to at least one of the following conditions: an area size for each object image, a color of each object image, and a pixel motion that is included in each object image.

3. The image processing method according to claim 1, wherein, in said constraint enforcement parameter learning step, adjacent pixels are chosen spatially from the plural images to become a pair and the respective pixels are assessed to belong to either an image area of the background image or an image area of each object, and different respective constraints are applied to the hidden parameter depending on whether the respective pixels belong to different objects or the respective pixels belong to the same object.

4. The image processing method according to claim 1, wherein said constraint enforcement parameter learning step includes learning the constraint enforcement parameter based on an energy minimization method using the estimation result from said hidden parameter estimation step as a training signal.

5. The image processing method according to claim 1, wherein each of the hidden parameters is expressed by a probability distribution.

6. The image processing method according to claim 1, wherein a background image motion, which is caused by camera motion, is included as one of the hidden parameters.

7. An image processing device adapted to simultaneously extract a background image, at least two object images, a shape of each object image and motion of each object image, which are defined as hidden parameters, from among plural images, said image processing device comprising:

an image input unit operable to accept input of plural images arranged in time series;

a hidden parameter estimation unit operable to estimate a hidden parameter based on the plural images and a constraint enforcement parameter, wherein the constraint enforcement parameter indicates a condition of at least one of the hidden parameters, using an iterative learning method;

a constraint enforcement parameter learning unit operable to learn a constraint enforcement parameter related to the hidden parameter using an estimation result from said hidden parameter estimation unit as a training signal;

a complementary learning unit operable to cause the estimation of the hidden parameter and the learning of the constraint enforcement parameter to be iterated, the estimation of the hidden parameters being performed by said hidden parameter estimation unit, which uses a learning result given by said constraint enforcement parameter learning unit, and the learning of the constraint enforcement parameter being performed by said constraint enforcement parameter learning unit, which uses the estimation result of the hidden parameter given by said hidden parameter estimation unit;

an output unit arranged to output the hidden parameter estimated by said hidden parameter estimation unit after the iterative learning is performed by said complementary learning unit; and an intermediate time image synthesis unit operable to:
receive the background image, the object images, the shapes of the object images, and the motion of the object images, which are hidden parameters outputted from said output unit,
synthesize, for each of at least two objects, an object image within an intermediate time between input images using the background image, the object images, the shapes of the object images and the motion of the object images, and
synthesize, for the object image synthesized for each of the at least two objects, an intermediate time image by superimposing the object image at the intermediate time onto the background image at the corresponding time,
wherein at least one of (i) said image input unit, (ii) said hidden parameter estimation unit, (iii) said constraint enforcement parameter learning unit, (iv) said complementary learning unit, (v) said output unit, and (vi) said intermediate time image synthesis unit, is implemented by a processor.

8. A non-transitory computer-readable medium having stored thereon an image processing program for simultaneously extracting a background image, at least two object images, a shape of each object image and motion of each object image, which are defined as hidden parameters, from among plural images arranged in time series, said image processing program causing a computer to execute:

an image input step of accepting input of plural images;

a hidden parameter estimation step of estimating a hidden parameter based on the plural images and a constraint enforcement parameter, wherein the constraint enforcement parameter indicates a condition of at least one of the hidden parameters, using and iterative learning method;

a constraint enforcement parameter learning step of learning a constraint enforcement parameter related to the hidden parameter using an estimation result from said hidden parameter estimation step as a training signal;

a complementary learning step of causing the estimation of the hidden parameter and the learning of the constraint enforcement parameter to be iterated, the estimation of the hidden parameters being performed in said hidden parameter estimation step, which uses a learning result given in said constraint enforcement parameter learning step, and the learning of the constraint enforcement parameter being performed in said constraint enforcement parameter learning step, which uses the estimation result of the hidden parameter given in said hidden parameter estimation step;

an output step of outputting the hidden parameter estimated in said hidden parameter estimation step after the iterative learning is performed in said complementary learning step; and an intermediate time image synthesis step of:
receiving the background image, the object images, the shapes of the object images, and the motion of the object images, which are hidden parameters outputted in said output step,
synthesizing, for each of at least two objects, an object image within an intermediate time between input images using the background image, the object images, the shapes of the object images and the motion of the object images, and
synthesizing, for the object image synthesized for each of the at least two objects, an intermediate time image by superimposing the object image at the intermediate time onto the background image at the corresponding time.

* * * * *